United States Patent
Watanabe et al.

(10) Patent No.: US 7,800,833 B2
(45) Date of Patent: Sep. 21, 2010

(54) ELECTRONIC IMAGING APPARATUS

(75) Inventors: Masahito Watanabe, Tokyo (JP);
Tomoyuki Satori, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/288,918

(22) Filed: Oct. 24, 2008

(65) Prior Publication Data
US 2009/0109546 A1    Apr. 30, 2009

(30) Foreign Application Priority Data
Oct. 30, 2007 (JP) .............................. 2007-281265
Jul. 17, 2008 (JP) .............................. 2008-186061

(51) Int. Cl.
*G02B 15/14* (2006.01)
(52) U.S. Cl. ..................... 359/687; 359/676; 359/690
(58) Field of Classification Search ................. 359/676, 359/683, 686–692; 348/240.99–240.3, 335–369; 396/72–88
See application file for complete search history.

(56) References Cited
U.S. PATENT DOCUMENTS
7,075,732 B2 *  7/2006  Watanabe et al. ........... 359/689

2008/0291297 A1 * 11/2008 Watanabe et al. ........ 348/240.3

FOREIGN PATENT DOCUMENTS

| JP | 8-271788 | 10/1996 |
|---|---|---|
| JP | 11-052244 | 2/1999 |
| JP | 2003-241097 | 8/2003 |
| JP | 2006-171055 | 6/2006 |

\* cited by examiner

*Primary Examiner*—Darryl J Collins
(74) *Attorney, Agent, or Firm*—Kenyon & Kenyon LLP

(57) ABSTRACT

An electronic imaging apparatus comprises a zoom lens including at least two lens groups and adapted to implement zooming by changing the spacing between the respective lens groups, and an electronic imaging device. The zoom lens includes at least one positive lens on an imaging device side with respect to an aperture stop, and satisfies the following conditions (1), (2) and (3).

$$|\alpha_t - \alpha_w| > 8 \tag{1}$$

$$1.0 \times 10^{-3} < P < 4.0 \times 10^{-3} \tag{2}$$

$$4 < f_t/f_w < 50 \tag{3}$$

10 Claims, 20 Drawing Sheets

- 61 Focal length change button
- 45 shutter button
- 46 flush
- 40 camera
- 43 finder optical system
- 60 カバー
- 44 finder optical path
- 41 imaging optical system
- 42 taking optical path

- 45 shutter button
- 61 focal length change button
- 43 finder optical system
- 47 liquid crystal display monitor
- 62 mode select switch

ELECTRONIC IMAGING APPARATUS

CROSS-REFERENCE TO RELATED APPLICATIONS

This application claims priority to Japanese Application No. 2007-281265 filed in Japan on Oct. 30, 2007, Japanese Patent Application No. 2008-186061 filed in Japan on Jul. 17, 2008 and Japanese Patent Application No. 2008-278464 filed in Japan on Oct. 29, 2008, the content of each of which are incorporated herein by this reference.

BACKGROUND OF THE INVENTION

The present invention relates generally to electronic imaging apparatus incorporating a zoom lens, and more particularly to electronic imaging apparatus reduced in size, inclusive of video cameras and digital cameras.

In recent years, imaging apparatus such as digital cameras designed to take images of subjects using solid-state imaging devices such as CCDs or CMOSs have gone mainstream in place of silver-halide film cameras. Further, they have now a wide spectrum of categories from the commercial high-end type to the compact low-end type. The present invention gives weight to the compact low-end type category in particular.

Users of such low-end type digital cameras would enjoy snapping shots over a wide range of scenes at any time in any place. For this reason, preference is given to small-format digital cameras, especially of the type that can be well put away in the pockets of clothing or baggage, are convenient to carry around, and are slimmed down in their thickness direction, and there is a mounting demand for size reductions of taking lens systems, too. On the other hand, as the pixels of imaging devices are now on the increase, there is a mounting demand for higher optical performance keeping pace with a lot more pixels. Further, to make sure mass productivity, it is required to minimize the sensitivity of optical performance deterioration to production errors in the process of processing and assembling lenses. From the point of view of making taking ranges wide, high zooming lenses having zoom ratios exceeding 5 or 7, too, are generally available; much higher zoom ratios are expected, and so are wider-angle arrangements. To meet such demands, there are now various types of zoom lenses proposed in the art.

Among prior zoom lenses having relatively high zoom ratios and compact format, there is a type comprising, in order from its object side, a positive first lens group, a negative second lens group, a positive third lens group and a positive fourth lens group, as set forth in the following patent publication 1.

[Patent Publication 1]
JP(A)2006-171055
[Patent Publication 2]
JP(A)11-52244
[Patent Publication 3]
JP(A)8-271788
[Patent Publication 4]
JP(A)2003-241097

Problems with the zoom lens put forward in Patent Publication 1 are, however, that it is not fit for size reductions, because the lens system has a long full length. With the zoom lens set forth in Patent Publication 2 or 3, there is no sufficient optical performance ensured.

The above prior arts are all designed such that all over the zoom range, the angle of incidence of rays on the imaging device becomes small; any sensible tradeoff cannot be offered between good imaging capabilities and size reductions while making sure high zoom ratios.

The zoom lens proposed in Patent Publication 4 is supposed to be used with single-lens reflex cameras with silver halide films loaded inside; the back focus for making sure a mirror space is longer relative to the large angle of exit of rays from the zoom lens optical system. Such power profiles require a lot more lenses to obtain satisfactory imaging capabilities, making it difficult to achieve size reductions in the event that the zoom lens is used with a small-format imaging device.

The invention has been made to meet the users demands for making taking ranges wider than ever before without detrimental to the ability of cameras to be carried around: the invention has for its object the provision of electronic imaging apparatus using a less costly zoom lens optical system that satisfies the requirements of making cameras smaller and having high zoom ratios and wide-angle arrangements at the same time, enables the image quality of taken images to be well kept, and lends itself to imaging devices such as CCDs or CMOSs.

SUMMARY OF THE INVENTION

According to the invention, the aforesaid object is accomplishable by the provision of an arrangement comprising a zoom lens wherein at least one positive lens is located on an imaging device side with respect to an aperture stop, with the satisfaction of the following conditions (1), (2) and (3):

$$|\alpha_t - \alpha_w| > 8 \quad (1)$$

$$1.0 \times 10^{-3} < P < 4.0 \times 10^{-3} \quad (2)$$

$$4 < f_t/f_w < 50 \quad (3)$$

where $f_w$ is the focal length of the whole zoom lens system at a wide-angle end, $f_t$ is the focal length of the whole zoom lens system at a telephoto end, $\alpha_w$ is an angle (°) with an optical axis of a chief ray for an image height defined by the farthest off-axis chief ray X 0.8 at the wide-angle end upon incidence on the imaging device on condition that a positive sign indicates that the height of a ray passing through the surface of the imaging device is lower than that of a ray passing through the surface of a lens just in front of the imaging device wherein the height of a ray refers to a distance between the position of the ray incident on the lens surface and the optical axis, $\alpha_t$ is an angle (°) with the optical axis of a ray for an image height defined by the farthest off-axis ray x 0.8 at the telephoto end upon incidence on the imaging device on condition that the height of a ray passing through the surface of the imaging device is lower than that of a ray passing through the surface of the lens just in front of the imaging device, and P is the pixel pitch of the imaging device (in mm).

For the purposes of aiding a better understanding of angle α with the optical axis, the following discussion is provided. FIG. 21 shows an optical axis and a chief ray for an image height defined by the outermost axis X 0.8. For a generally available imaging device an aspect ratio of 4:3 is present, and if the diagonal of this imaging device is taken as the outermost axis, then a light ray incident on the laterally outermost area of the imaging device provides one of the chief rays for the image height defined by the outermost axis X 0.8. In FIG. 22, a sectional view taken along the horizontal plane of FIG. 21 is shown. In FIG. 22, the optical axis and a parallel axis to the optical axis are shown, as well as the chief ray for an image height defined by the outermost axis X 0.8. The angle α is defined by an angle of the chief ray for an image height defined by the outermost axis X 0.8 with respect to the optical axis, but since an angle with respect to the parallel axis to the optical axis has the same magnitude, for the purposes of providing clearer illustration the angle α is illustrated in FIG. 22 in connection with the parallel axis to the optical axis. In FIG. 22, the value of the angle α at the wide angle end is $α_w$, and the value of the angle α at the telephoto end is $α_t$.

Generally in imaging apparatus comprising an electronic imaging device such as a CCD and an imaging optical system, as the angle of exit is large with respect to the optical axis of the optical system, there is a drop of the efficiency of receiving light at the imaging device, and at the peripheral portion of the screen involved, no sufficient quantity of light is obtainable, making image quality likely to go worse. With a zoom lens designed to make the angle of incidence on the imaging device parallel with the optical axis, however, difficulty would be encountered in offering a sensible tradeoff between high zoom ratios and size reductions. In the invention, the refracting power and shape of a lens located on an image plane side with respect to the stop are properly determined so that the quantity of rim light rays is well balanced against the angle of exit of light rays at the wide-angle and telephoto ends, while the lenses are located in such a way as to satisfy the above conditions to make sure high zoom ratios and minimize fluctuations of field curvature.

Given the upper limit to condition (1), it is then possible to prevent the total length of the optical system from growing too long, and given the lower limit to condition (1), it is then possible to hold back fluctuations of field curvature due to the final lens group. Abiding by both the upper and the lower limit is the requirement for offering a sensible tradeoff between high zoom ratios and size reductions while good imaging capabilities are kept intact.

Given the upper limit to condition (2), it then possible to obtain sufficient resolving power with taken images without increasing the area of the imaging device so that the zoom lens can be downsized, and given the lower limit to condition (2), it is then possible to avoid sufficient resolving power being not obtained with respect to the pixel pitch even when aberrations remain small due to the diffraction of light.

Abiding by the upper limit to condition (3) is preferable because by locating the lenses in such a way as to satisfy the relation of condition (1), the total length of the zoom lens on the telephoto side can be shortened so that the size reductions one object of the invention can be achieved. Falling short of the lower limit to condition (3) makes it possible to design, even without relying upon the arrangement of the invention, any zoom lens that has a shortened full length, comprises a fewer lenses, and allows a lens barrel unit to be fully slimmed down upon received in a lens mount.

Further, the above invention should more preferably have any one of the following requirements.

It is more preferable to satisfy the following conditions (4) and (5) so as to place the exit pupil more on the object side than the receiving surface of the imaging device at the wide-angle end, and place the receiving surface of the imaging device more on the object side than the exit pupil at the telephoto end.

$$-40 < α_w < -9 \quad (4)$$

$$1.8 < α_t < 10 \quad (5)$$

$α_w$ is an angle (°) with the optical axis of a chief ray for an image height defined by the farthest off-axis site X 0.8 at the wide-angle end upon incidence on the imaging device on condition that the positive sign indicates that the height of a ray passing through the surface of the imaging device is lower than that of a ray passing through the surface of a lens just in front of the imaging device wherein the height of a ray refers to a distance between the position of the ray incident on the lens surface and the optical axis, and $α_t$ is an angle (°) with the optical axis of a ray for an image height defined by the farthest off-axis site X 0.8 at the telephoto end upon incidence on the imaging device on condition that the height of a ray passing through the surface of the imaging device is lower than that of a ray passing through the surface of a lens just in front of the imaging device.

Abiding by the upper limit to condition (4) is preferable, because the exit pupil at the telephoto end is not going to lie in the plus direction with respect to an imaging plane so that for an imaging device optimized for a lens having an exit pupil lying in the minus direction, it is possible to prevent the S/N from going down at the peripheral portion of the screen involved. Abiding by the lower limit to condition (4) is preferable because the angle of incidence of light on the imaging device at the wide-angle end is prevented from growing too large, minimizing deterioration of image quality at the wide-angle end.

Likewise, abiding by the upper limit to condition (5) is preferable, because for an imaging device optimized for a lens having an exit pupil lying in the minus direction, it is possible to prevent the angle of incidence of light on the imaging device at the wide-angle end from growing too large, thereby preventing deterioration of image quality at the wide-angle end.

It is more preferable to satisfy the following condition (6)

$$0.25 < f_{sr}/f_t < 0.41 \quad (6)$$

where $f_{sr}$ is the focal length of the lens group nearest to the imaging device, and $f_t$ is the focal length of the whole zoom lens system at the telephoto end.

Abiding by the upper limit to condition (6) is preferable for shortening the total length of the optical system according to the inventive arrangement, and abiding by the lower limit to condition (6) is preferable for preventing large fluctuations of the angle of incidence of rays on the imaging device at the wide-angle and telephoto ends, thereby keeping image quality at the peripheral portion of the screen good at both the wide-angle end and the telephoto end.

For the aperture stop in the zoom lens used with the electronic imaging apparatus of the invention, it is preferable to move in a direction away from the imaging device upon zooming from the wide-angle end to the telephoto end. This makes it easy to slenderize an effective light beam through a rear group at the wide-angle end, working for size reductions.

That zoom lens should preferably comprise, in order from its object side, a first lens group having positive refracting power, a second lens group having negative refracting power, an aperture stop, and a third lens group having positive refracting power, wherein upon zooming from the wide-angle end to the telephoto end, the spacing between the first and the second lens group grows wide and the spacing between the second and the third lens group becomes narrow, because it is easy to have a high zoom ratio while coma and field curvature are kept good.

Further, it is preferable to locate a fourth lens group on the image plane side of the third lens group so that focusing from a state in focus on infinity to a state in focus on a nearby object distance can be implemented by letting out the fourth lens group. It is then preferable to incorporate a positive lens having an aspheric surface in the fourth lens group and satisfy the following condition (7) so as to minimize fluctuations of field curvature.

$$-1<(R_{4r}+R_{4f})/(R_{4r}-R_{4f})<0 \quad (7)$$

where $R_{4r}$ is the radius of curvature on the image plane side of the positive lens in the fourth lens group, and $R_{4f}$ is the radius of curvature on the object side of the positive lens in the fourth lens group.

Abiding by the upper limit to condition (7) is preferable in view of design, because even at high zoom ratios, it is easy to reduce field curvature at the wide-angle end. Abiding by the lower limit to condition (7) is preferable for holding back fluctuations of field curvature upon focusing from the state in focus on infinity to the state in focus on a nearby object distance.

With the above arrangement, it is preferable to incorporate a positive lens nearest to the object side of the third lens group, use an aspheric surface there, and allow that lens shape to satisfy the following condition (8).

$$0.2<(R_{3r}+R_{3f})/(R_{3r}-R_{3f})<0.8 \quad (8)$$

where $R_{3r}$ is the radius of curvature on the image plane side of the positive lens in the third lens group, and $R_{3f}$ is the radius of curvature on the object side of the positive lens in the third lens group.

Satisfaction of condition (8) makes it easy to design the zoom lens without throwing spherical aberrations and coma off balance. Given the upper limit to condition (8), spherical aberrations and coma can be kept small all over the zoom range, and given the lower limit to condition (8), it is easy to shift the principal points of the third lens group in front. This provides an arrangement preferable for minimizing coma at an increased zoom ratio.

It is thus possible to keep field curvature and coma good on the wide-angle and telephoto ends even at an increased zoom ratio while minimizing a decrease in rim rays due to the angle-of-incidence characteristics to the electronic imaging device and, hence, provide a camera having a good ability to be carried around and a high-zoom-ratio zoom function.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

In the following examples that underlie the invention, there is a less costly zoom lens optical system provided, which, through such contrivances as described above, meets simultaneously the requirements for a downsized arrangement and a wide-angle/higher zoom ratio arrangement for cameras that satisfy users demands for making the taking area involved wider than ever before without detrimental to the ability of cameras to be carried around, enables the quality of taken images to be well maintained, and lends itself to electronic imaging devices such as CCDs or CMOSs.

The following examples are each directed to an imaging apparatus incorporating a zoom lens of the type wherein lenses are let out at the startup. More exactly, Examples 1 to 16 each provide a zoom lens having higher optical performance and improved in terms of compactness. Throughout Examples 1 to 16, the effective imaging area is of constant rectangular shape in all zooming states. In the respective examples, the values for the specific conditions have been found at the time of focusing on an object point at infinity. Total Length is the axial distance from the entrance surface to the exit surface of the zoom lens plus a back focus as calculated on an air basis.

The zoom lens of the invention is now explained with reference to Examples 1 to 8. FIGS. 1 to 8 are illustrative in lens arrangement section of Examples 1 to 8 at the wide-angle end (a), in the intermediate setting (b) and at the telephoto end (c) upon focusing on an object point at infinity. Throughout FIGS. 1 to 8, G1 stands for the first lens group; G2 the second lens group; S the aperture stop; G3 the third lens group; G4 the fourth lens group; G5 the fifth lens group; F an optical low-pass filter; C the cover glass of a CCD that is an electronic imaging device; and I the image plane of the CCD. Note here that for a near infrared sharp cut coating, for instance, it may be coated directly on the optical low-pass filter F or, alternatively, there may be another infrared cut absorption filter located.

It is here noted that drawings for Examples 9 to 16 are not attached hereto because they are similar in construction to Examples 1 to 8, respectively.

Figure 1:
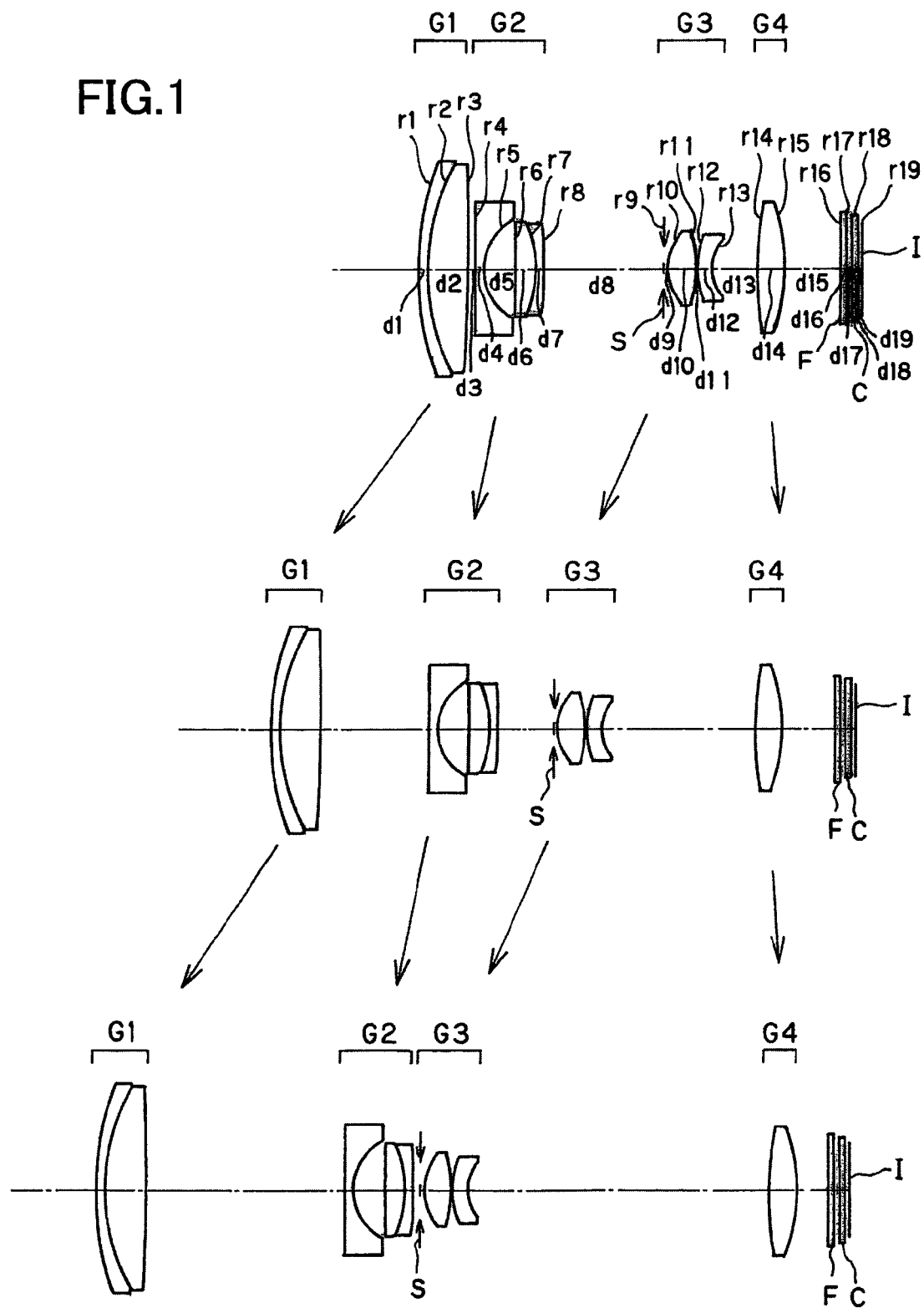
FIG. 1 is illustrative in lens arrangement section of Example 1 of the inventive zoom lens at the wide-angle end (a), in an intermediate setting (b) and at the telephoto end (c) upon focusing on an object point at infinity.

Example 1 is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power, as shown in FIG. 1.

Upon zooming from the wide-angle end to the telephoto end, the respective lens groups move as follows. Throughout Examples 1 to 8 here, note that the point of change in the direction of movement of the second G2, the third G3 or the fourth lens group G4 from the wide-angle end to the intermediate state is defined as the intermediate setting.

The first lens group G1 moves toward the object side from the wide-angle end to the telephoto end.

From the wide-angle end to the telephoto end, the second lens group G2 moves toward the object side while the spacing between the first lens group G1 and it grows wide and the spacing between it and the third lens group G3 becomes narrow.

From the wide-angle end to the telephoto end, the aperture stop S and the third lens group G3 move in unison toward the object side.

From the wide-angle end to the telephoto end, the fourth lens group G4 moves toward the image side while the spacing between the third lens group G3 and it grows wide.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a negative meniscus lens convex on its object side; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, one at the image side-surface of the negative meniscus lens in the third lens group G3, and one at the image-side surface of the double-convex positive lens in the fourth lens group G4.

Figure 2:
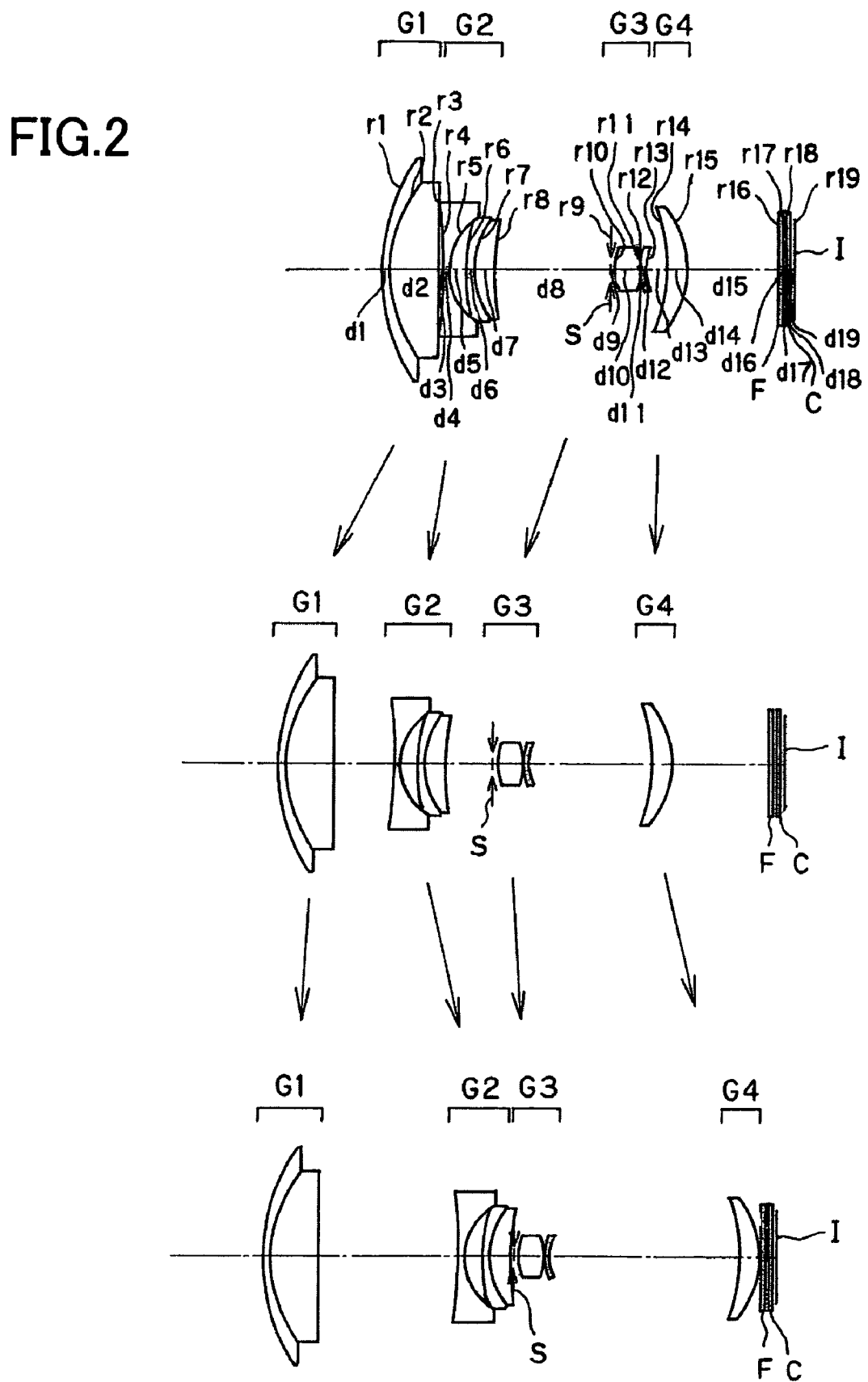
FIG. 2 is illustrative, as in FIG. 1, of Example 2 of the inventive zoom lens.

Example 2 is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power, as shown in FIG. 2.

From the wide-angle end to the telephoto end, the first lens group G1 moves toward the object side.

From the wide-angle end to the intermediate setting, the second lens group G2 moves toward the object side while the spacing between the first lens group G1 and it grows wide and the spacing between it and the third lens group G3 becomes narrow, and from the intermediate setting to the telephoto end, the second lens group G2 moves toward the image side while the spacing between the first lens group G1 and it grows wide and the spacing between it and the third lens group G3 becomes narrow. In the intermediate setting, the second lens group G2 is positioned more on the object side than at the wide-angle end, and at the telephoto end, the second group G2 is positioned more on the image side than at the wide-angle end.

From the wide-angle end to the intermediate setting, the aperture stop S and the third lens group G3 move toward the object side while the spacing between the second lens group G2 and them becomes narrow and the spacing between them and the fourth lens group G4 grows wide, and from the intermediate setting to the telephoto end, they move toward the image side while the spacing between the second lens group G2 and them becomes narrow and the spacing between them and the fourth lens group G4 grows wide. In the intermediate setting, they are positioned more on the object side than at the wide-angle end, and at the telephoto end, they are positioned more on the object side than at the wide-angle end and more the image side than in the intermediate setting.

From the wide-angle end to the intermediate setting, the fourth lens group G4 moves toward the object side while the spacing between the third lens group G3 and it grows wide, and from the intermediate setting to the telephoto end, the fourth lens group G4 moves toward the image side while the spacing between the third lens group G3 and it grows wide. In the intermediate setting, the fourth lens group G4 is moved a little more on the object side than at the wide-angle end, and at the telephoto end, the fourth lens group G4 is positioned more on the image side than at the wide-angle end.

In order from the object side, the first lens group G1 is made up of a cemented lens of a negative meniscus lens convex on its object side and a double-convex positive lens; the second lens group G2 is made up of a double-concave negative lens and a cemented lens of a negative meniscus lens convex on its object side and a positive meniscus lens convex on its object side; the third lens group G3 is made up of a double-convex positive lens and a negative meniscus lens convex on its object side; and the fourth lens group G4 is made up of one positive meniscus lens convex on its image side.

Eight aspheric surfaces are used: one at the surface nearest to the image side of the cemented lens in the first lens group G1, two at both surfaces of the double-concave negative lens in the second lens group G2, one at the surface nearest to the object side of the cemented lens in the second lens group G2, two at both surfaces of the double-convex positive lens in the third lens group G3, and two at both surfaces of the positive meniscus lens in the fourth lens group G4.

Figure 3:
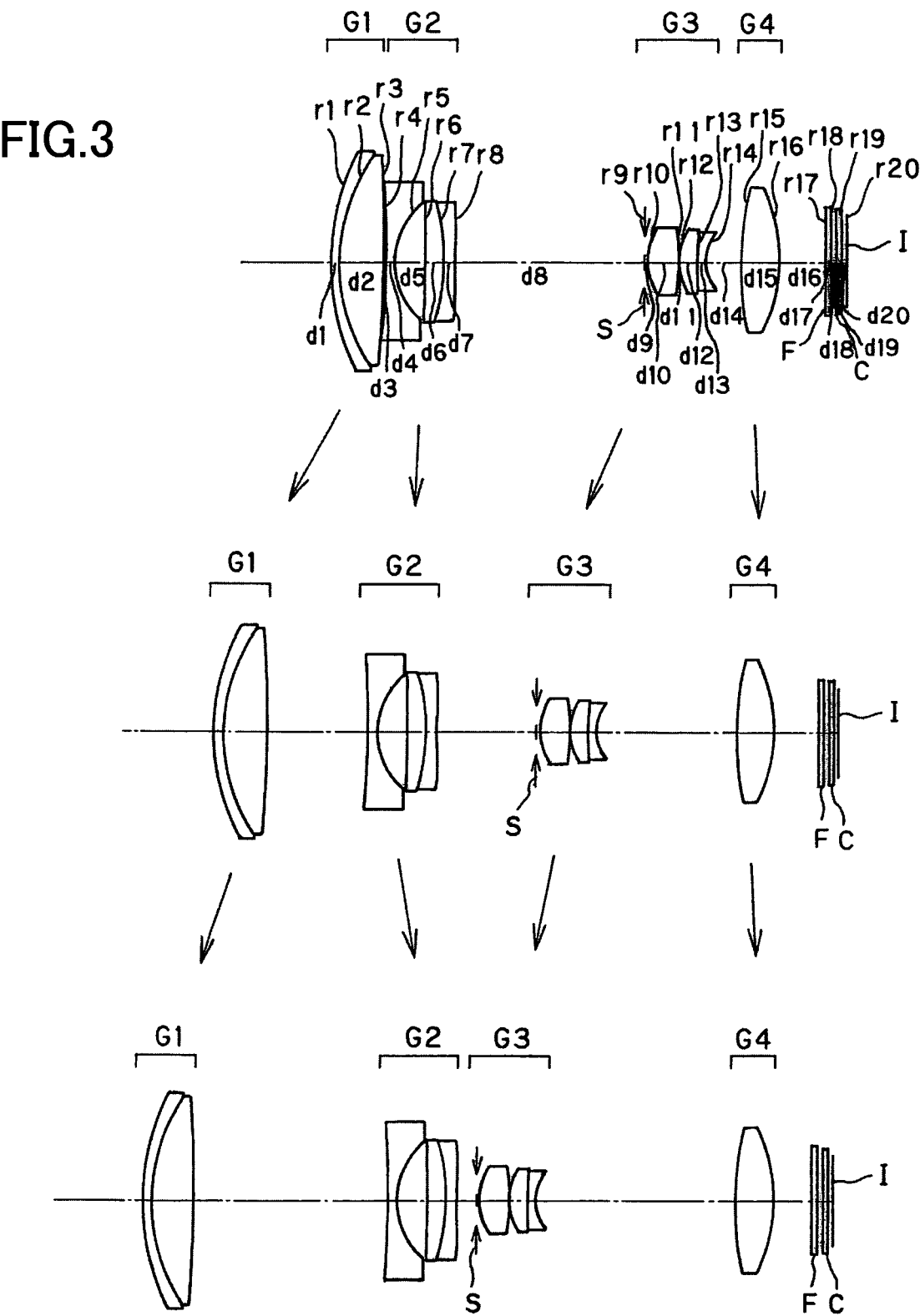
FIG. 3 is illustrative, as in FIG. 1, of Example 3 of the inventive zoom lens.

Example 3 is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power, as shown in FIG. 3.

How the lens groups move upon zooming from the wide-angle end to the telephoto end is now explained.

From the wide-angle end to the telephoto end, the first lens group G1 moves toward the object side.

From the wide-angle end to the intermediate setting, the second lens group G2 moves toward the object side while the spacing between the first lens group G1 and it grows wide and the spacing between it and the third lens group G3 becomes narrow, and from the intermediate setting to the telephoto end, it moves toward the image side while the spacing between the first lens group G1 and it grows wide and the spacing between it and the third lens group G3 becomes narrow. In the intermediate setting, the second lens group G2 is positioned a little more on the object side than at the wide-angle end, and at the telephoto end, it is positioned more on the image side than at the wide-angle end.

From the wide-angle end to the telephoto end, aperture stop S and the third lens group G3 move toward the object side while the spacing between the second lens group G2 and them becomes narrow and the spacing between them and the fourth lens group G4 grows wide.

From the wide-angle end to the telephoto end, the fourth lens group G4 moves toward the image side while the spacing between the third lens group G3 and it grows wide.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, and two at both surfaces of the double-convex positive lens in the fourth lens group G4.

Figure 4:
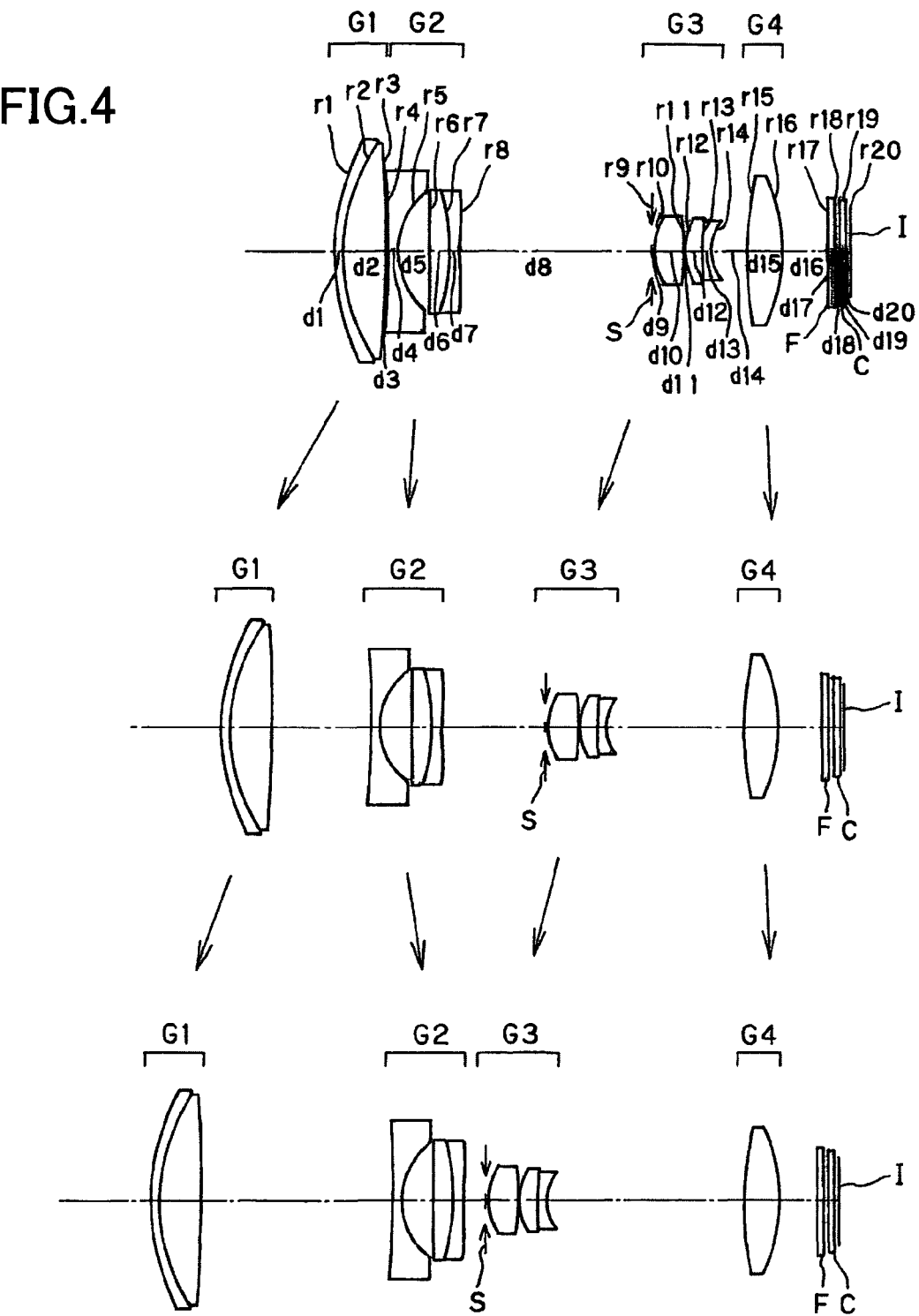
FIG. 4 is illustrative, as in FIG. 1, of Example 4 of the inventive zoom lens.

Example 4 is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power, as shown in FIG. 4.

How the lens groups move upon zooming from the wide-angle end to the telephoto end is now explained.

From the wide-angle end to the telephoto end, the first lens group G1 moves toward the object side.

From the wide-angle end to the intermediate setting, the second lens group G2 moves toward the object side while the spacing between the first lens group G1 and it grows wide and the spacing between it and the third lens group becomes narrow, and from the intermediate setting to the telephoto end, it moves toward the image side while the spacing between the first lens group G1 and it grows wide and the spacing between it and the third lens group G3 becomes narrow. In the intermediate setting, the second lens group G2 is positioned a little more on the object side than at the telephoto end, and at the telephoto end, it is positioned a little more on the image side than at the wide-angle end.

From the wide-angle end to the intermediate setting, the aperture stop S and the third lens group G3 move toward the object side while the spacing between the second lens group G2 and them becomes narrow and the spacing between them and the fourth lens group G4 grows wide.

From the wide-angle end to the telephoto end, the fourth lens group G4 moves toward the image side while the spacing the third lens group G3 and it grows wide.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, and two at both surface of the double-convex positive lens in the fourth lens group G4.

Figure 5:
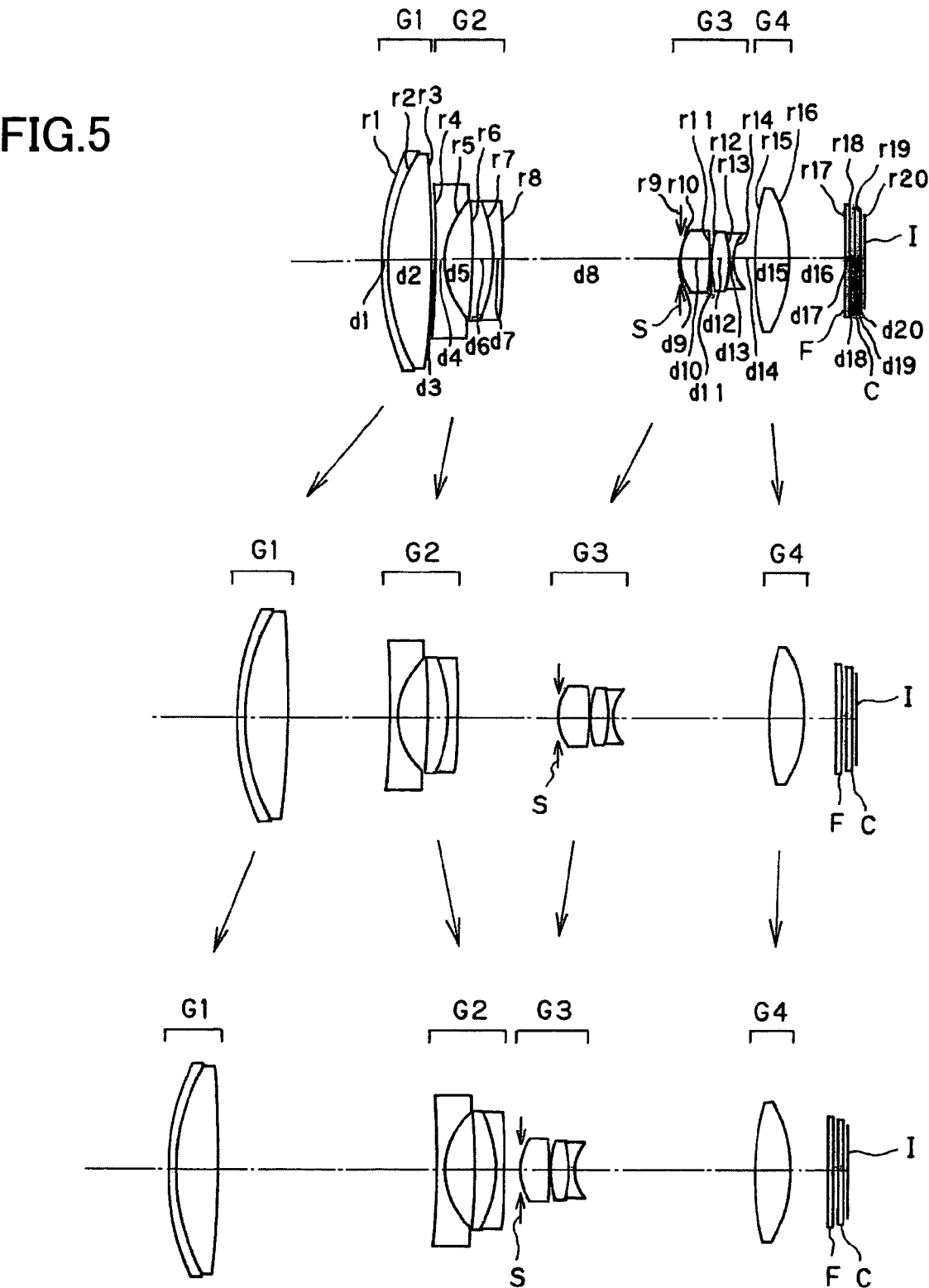
FIG. 5 is illustrative, as in FIG. 1, of Example 5 of the inventive zoom lens.

Example 5 is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power, as shown in FIG. 5.

How the lens groups move upon zooming from the wide-angle end to the telephoto end is now explained.

From the wide-angle end to the telephoto end, the first lens group G1 moves toward the object side.

From the wide-angle end to the intermediate setting, the second lens group G2 moves toward the object side while the spacing between the first lens group G1 and it grows wide and the spacing between it and the third lens group G3 becomes narrow, and from the intermediate setting to the telephoto end, it moves toward the image side while the spacing between the first lens group G1 and it grows wide and the spacing between it and the third lens group G3 becomes narrow. In the intermediate setting, the second lens group G2 is positioned a little more on the object side than at the wide-angle end, and at the telephoto end, it is positioned more on the image side than at the wide-angle end.

From the wide-angle end to the telephoto end, the aperture stop S and the third lens group G3 move toward the object side while the spacing between the second lens group G2 and them becomes narrow and the spacing between them and the fourth lens group G4 grows wide.

From the wide-angle end to the intermediate setting, the fourth lens group G4 moves toward the image side while the spacing between the third lens group G3 and it grows wide, and from the intermediate setting to the telephoto end, it moves toward the object side while the spacing between the third lens group G3 and it grows wide. In the intermediate setting, the fourth lens group G4 is positioned more on the image side than at the wide-angle end, and at the telephoto end, it is positioned a little more on the object side than in the intermediate setting.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a double-convex positive lens and a double-concave negative lens; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3 and two at both surfaces of the double-convex positive lens in the fourth lens group G4.

Figure 6:
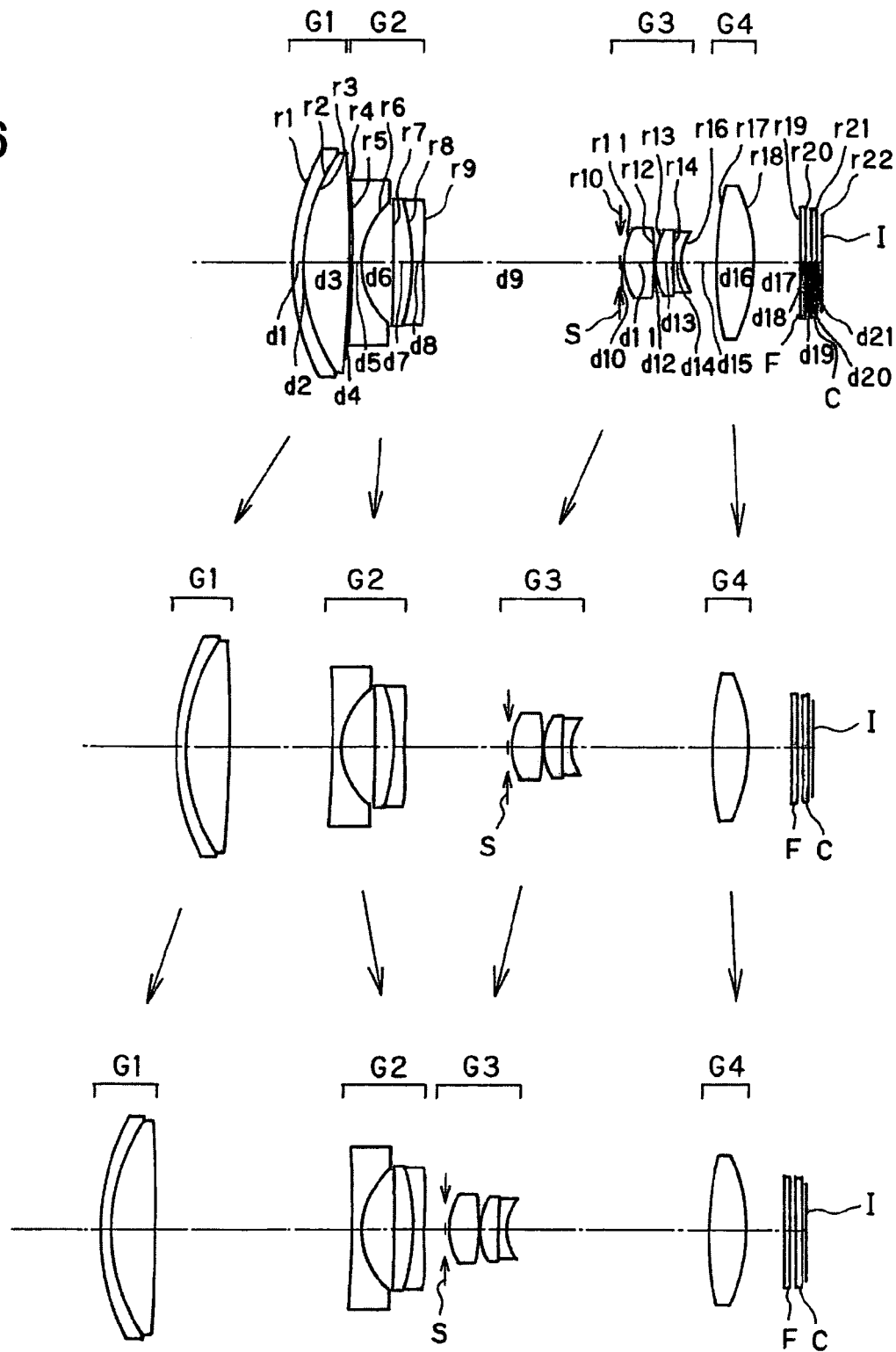
FIG. 6 is illustrative, as in FIG. 1, of Example 6 of the inventive zoom lens.

Example 6 is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power, as shown in FIG. 6.

How the lens groups move upon zooming from the wide-angle end to the telephoto end is now explained.

From the wide-angle end to the telephoto end, the first lens group G1 moves toward the object side.

From the wide-angle end to the intermediate setting, the second lens group G2 moves toward the object side while the spacing between the first lens group G1 and it grows wide and the spacing between it and the third lens group G3 becomes narrow, and from the intermediate setting to the telephoto end, it moves toward the image side while the spacing between the first lens group G1 and it grows wide and the spacing between it and the third lens group G3 becomes narrow. In the intermediate setting, the second lens group G2 is positioned a little more on the object side than at the wide-angle end, and at the telephoto end, it is positioned a little more on the image side than at the wide-angle end.

From the wide-angle end to the telephoto end, the aperture stop S and the third lens group G3 move toward the object side while the second lens group G2 and them becomes narrow and the spacing between them and the fourth lens group G4 grows wide.

From the wide-angle end to the telephoto end, the fourth lens group G4 moves toward the image side while the spacing between the third lens group G3 and it grows wide.

In order from the object side, the first lens group G1 is made up of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the image-side surface of the double-convex positive lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, and two at both surfaces of the double-convex positive lens in the fourth lens group G4.

Figure 7:
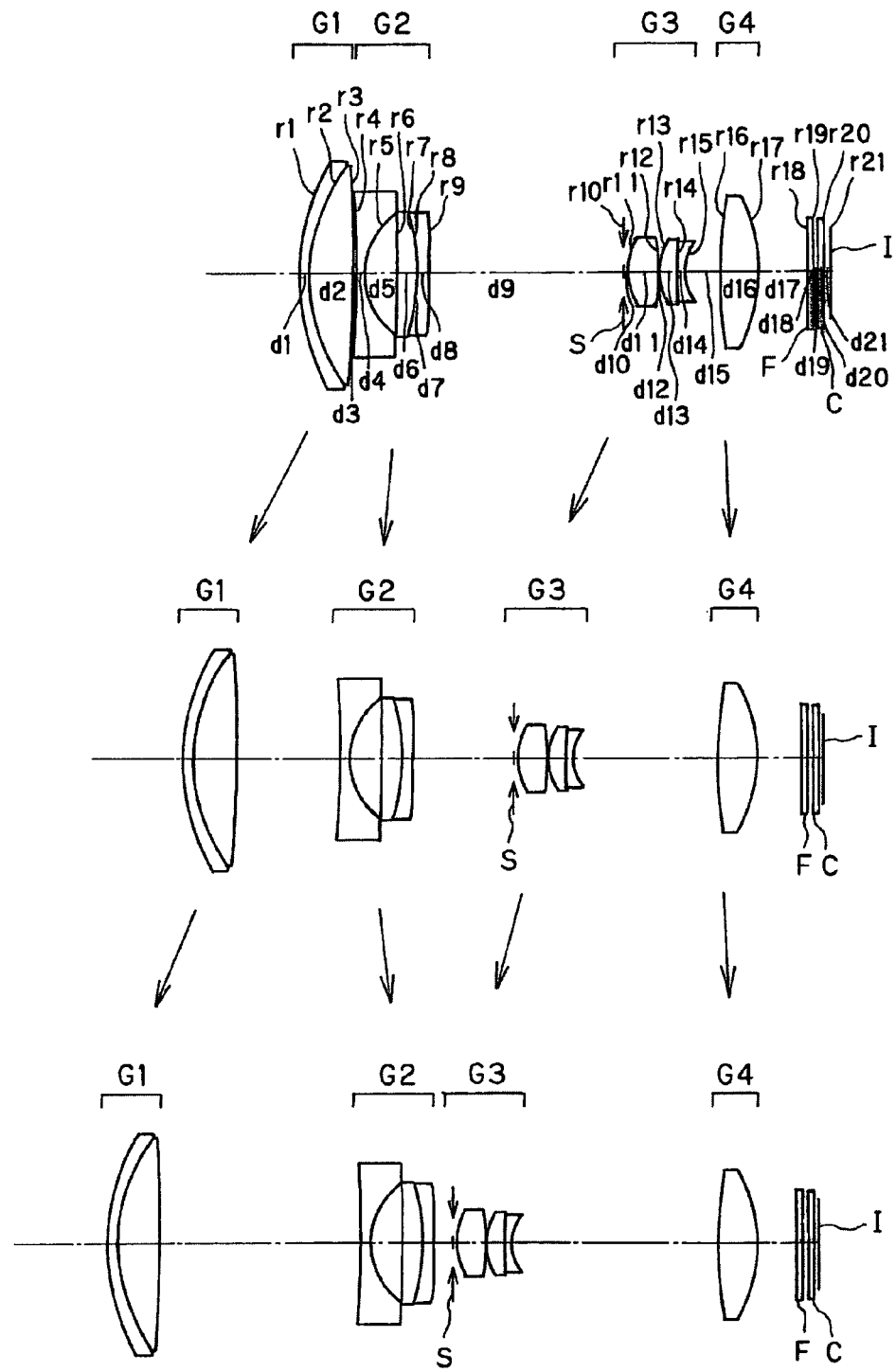
FIG. 7 is illustrative, as in FIG. 1, of Example 7 of the inventive zoom lens.

Example 7 is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power, as shown in FIG. 7.

How the lens groups move upon zooming from the wide-angle end to the telephoto end is now explained.

From the wide-angle end to the telephoto end, the first lens group G1 moves toward the object side.

From the wide-angle end to the intermediate setting, the second lens group G2 moves toward the object side while the spacing between the first lens group G1 and it grows wide and the spacing between it and the third lens group G3 becomes narrow, and from the intermediate setting to the telephoto end, it moves toward the image side while the spacing between the first lens group G1 and it grows wide and the spacing between it and the third lens group G3 becomes narrow. In the intermediate setting, the second lens group G2 is positioned a little more on the object side than at the wide-angle end, and at the telephoto end, it is positioned a little more on the image side than at the wide-angle end.

From the wide-angle end to the telephoto end, the aperture stop S and the third lens group G3 move toward the object side while the spacing between the second lens group G2 and them becomes narrow and the spacing between them and the fourth lens group G4 grows wide.

From the wide-angle end to the telephoto end, the fourth lens group G4 moves toward the image side while the spacing between the third lens group G3 and it grows wide.

In order from the object side, the first lens group G1 is made up of a cemented lens of a negative meniscus lens convex on its object side and a double-convex positive lens; the second lens group G2 is made up of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the surface nearest to the image side of the cemented lens in the first lens group G1, two at both surfaces of the image-side double-concave negative lens in the second lens group G2, one at the image-side surface of the object-side double-concave negative lens in the second lens group G2, two at both surfaces of the double-convex positive lens in the third lens group G3, and two at both surfaces of the double-convex positive lens in the fourth lens group G4.

Figure 8:
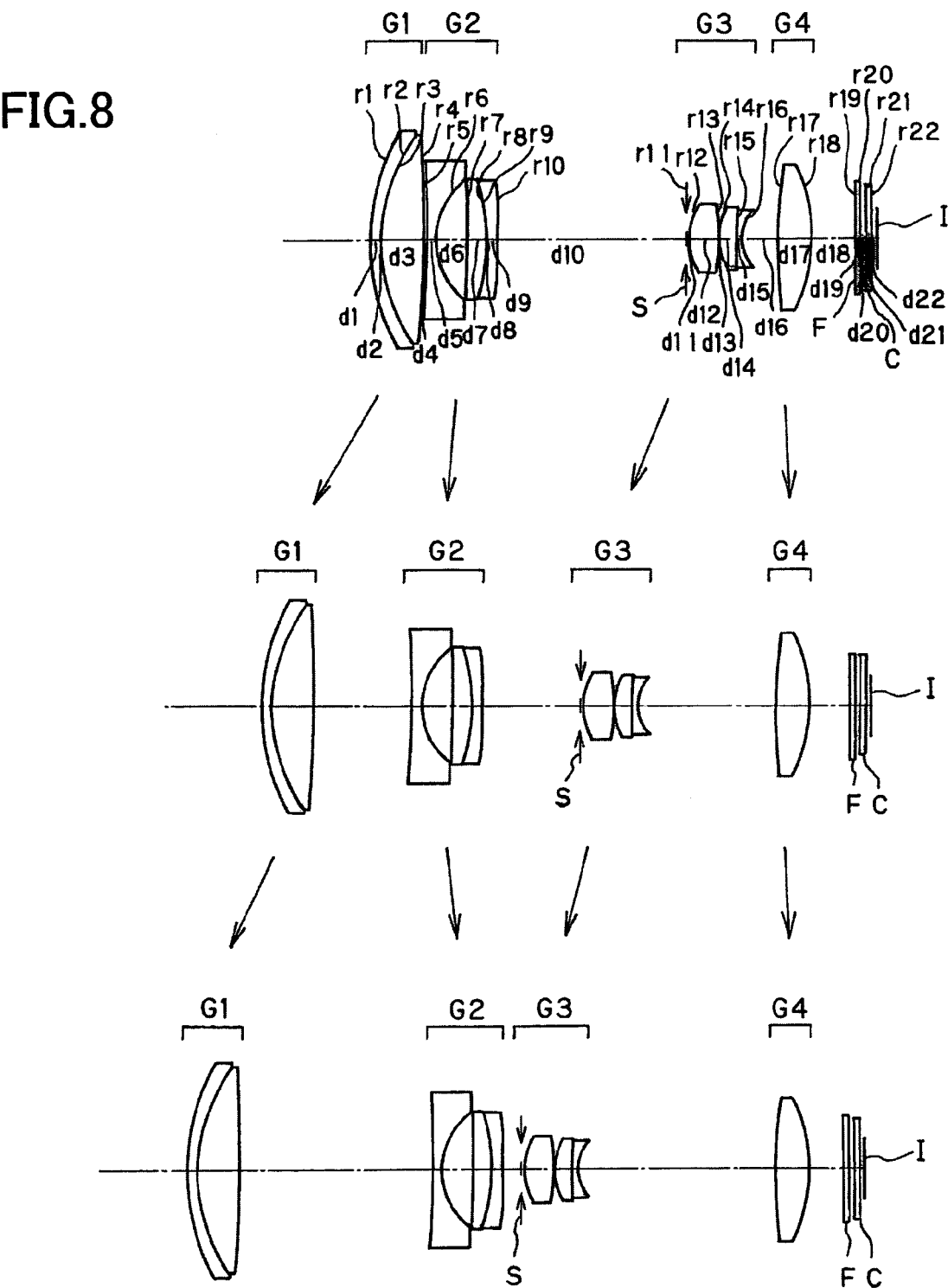
FIG. 8 is illustrative, as in FIG. 1, of Example 8 of the inventive zoom lens.
Figure 9:
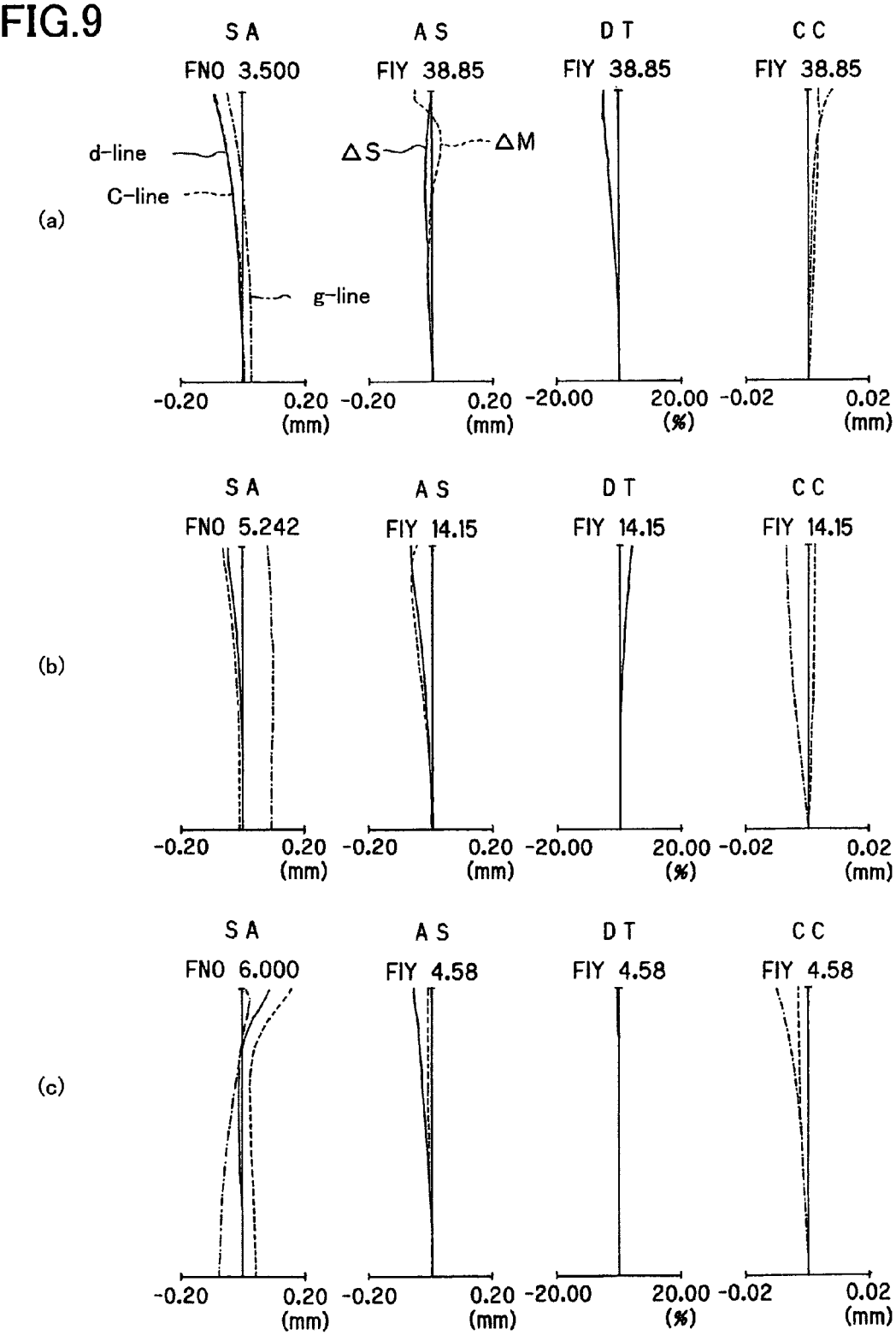
FIG. 9 is an aberration diagram for Example 1 upon focusing on an object point at infinity.
Figure 10:
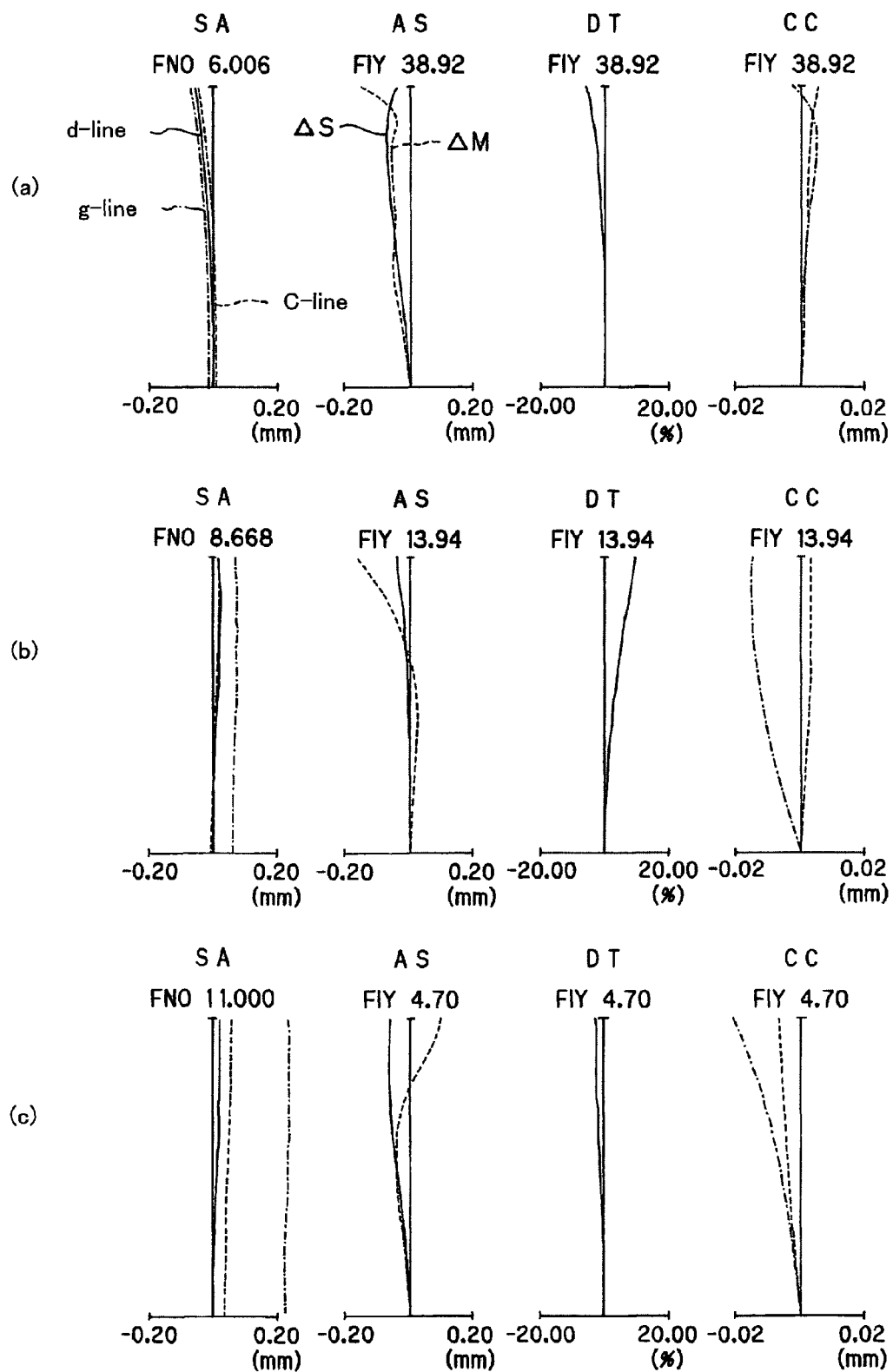
FIG. 10 is an aberration diagram for Example 2 upon focusing on an object point at infinity.
Figure 11:
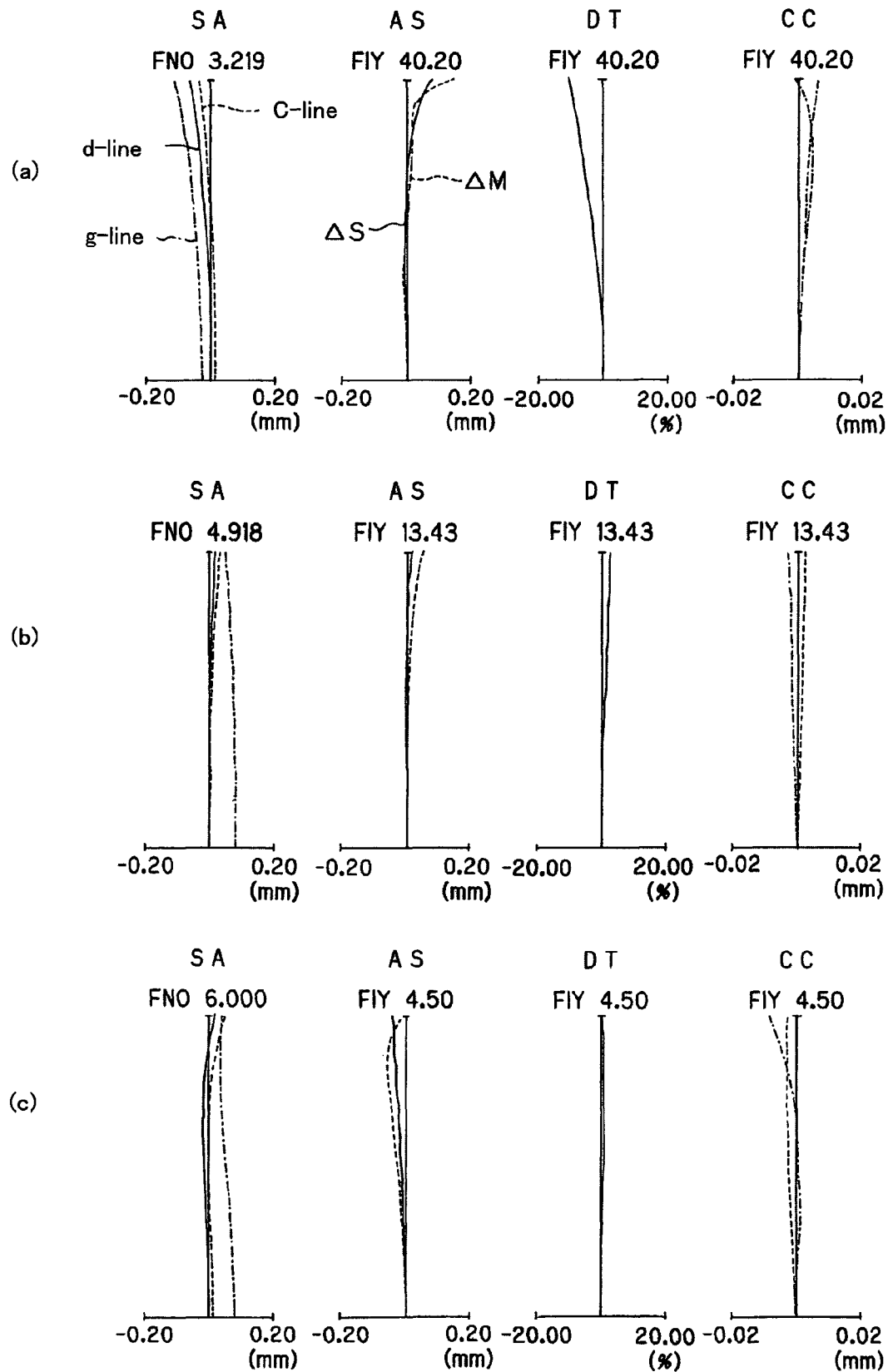
FIG. 11 is an aberration diagram for Example 3 upon focusing on an object point at infinity.
Figure 12:
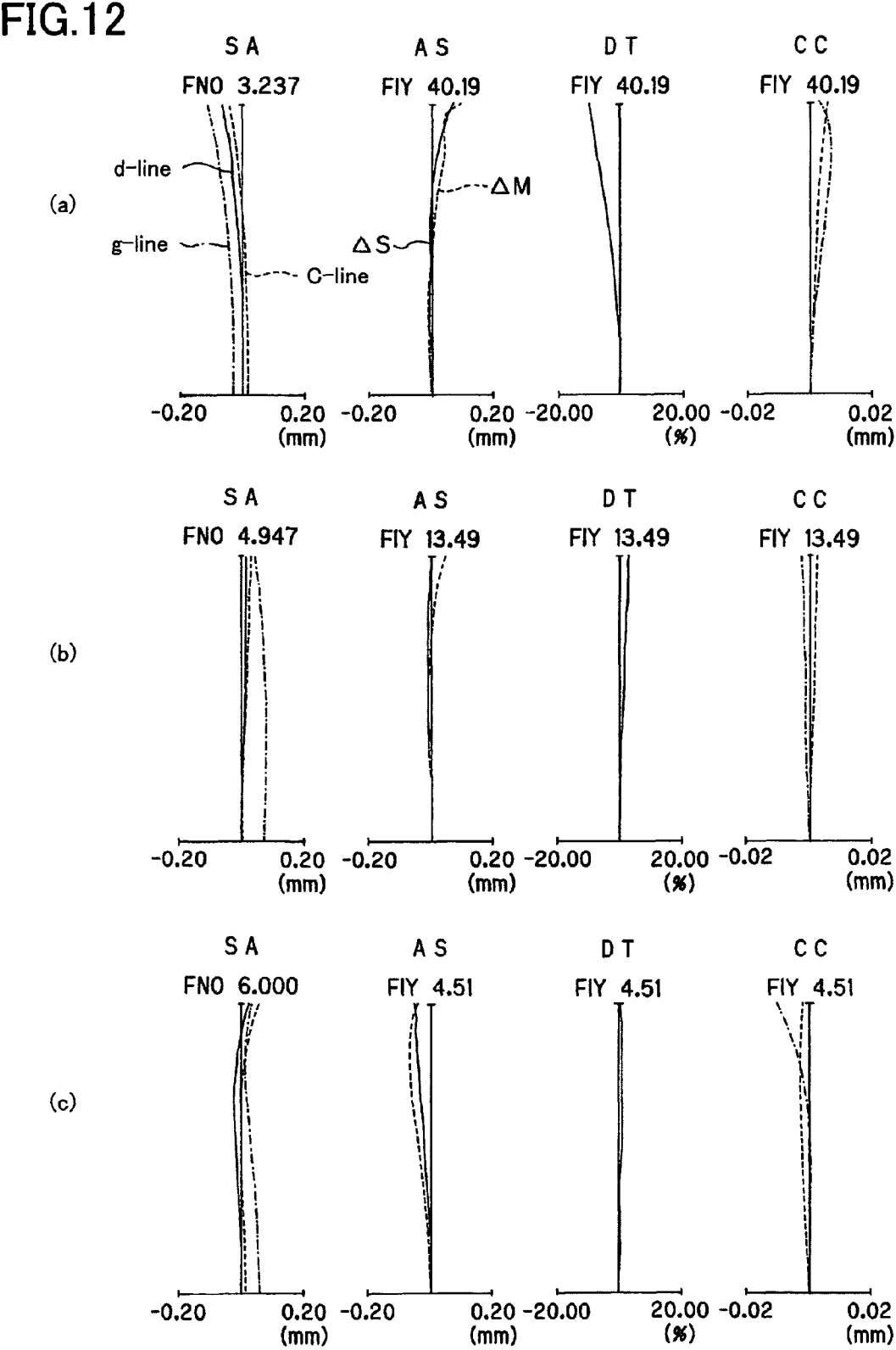
FIG. 12 is an aberration diagram for Example 4 upon focusing on an object point at infinity.
Figure 13:
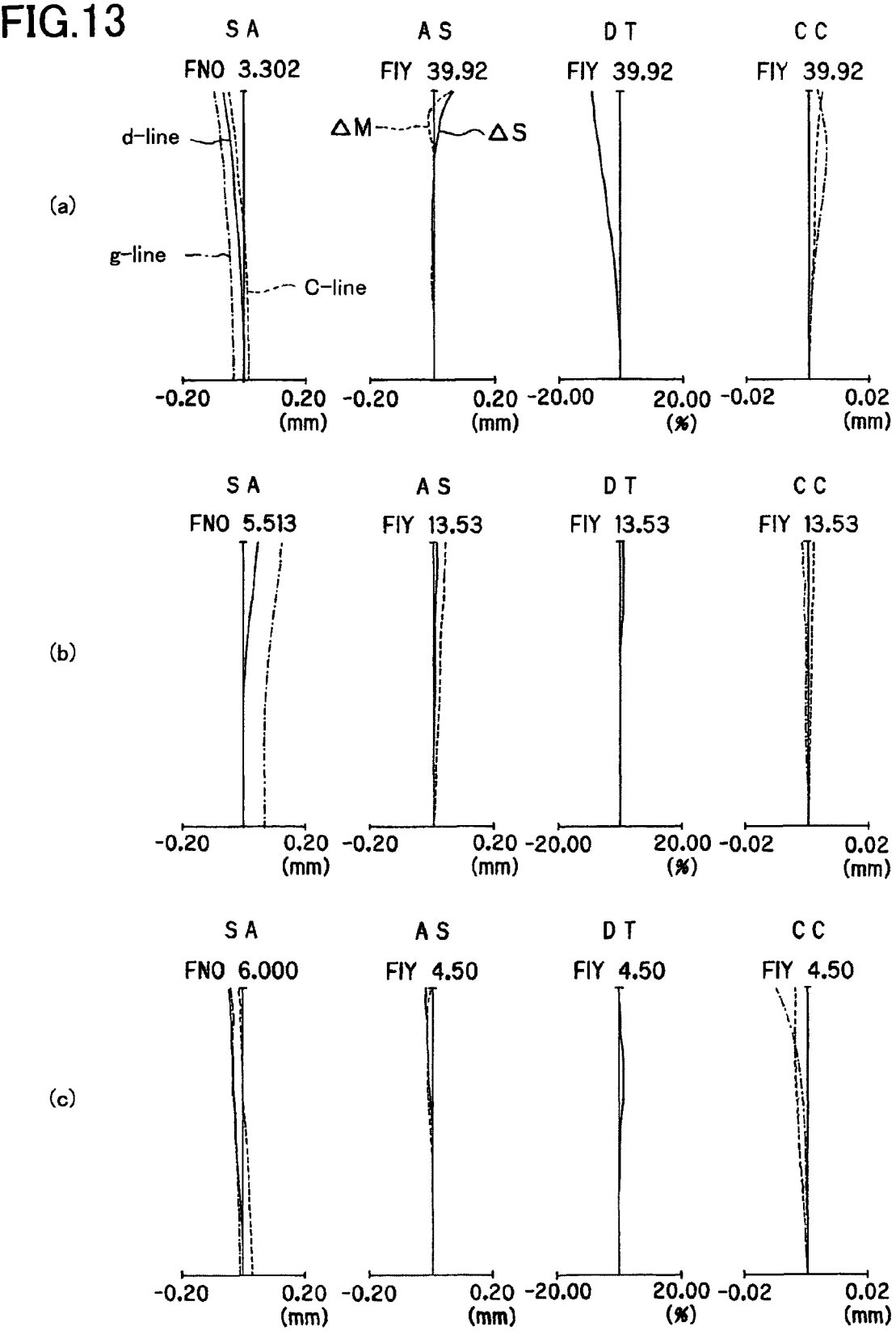
FIG. 13 is an aberration diagram for Example 5 upon focusing on an object point at infinity.
Figure 14:
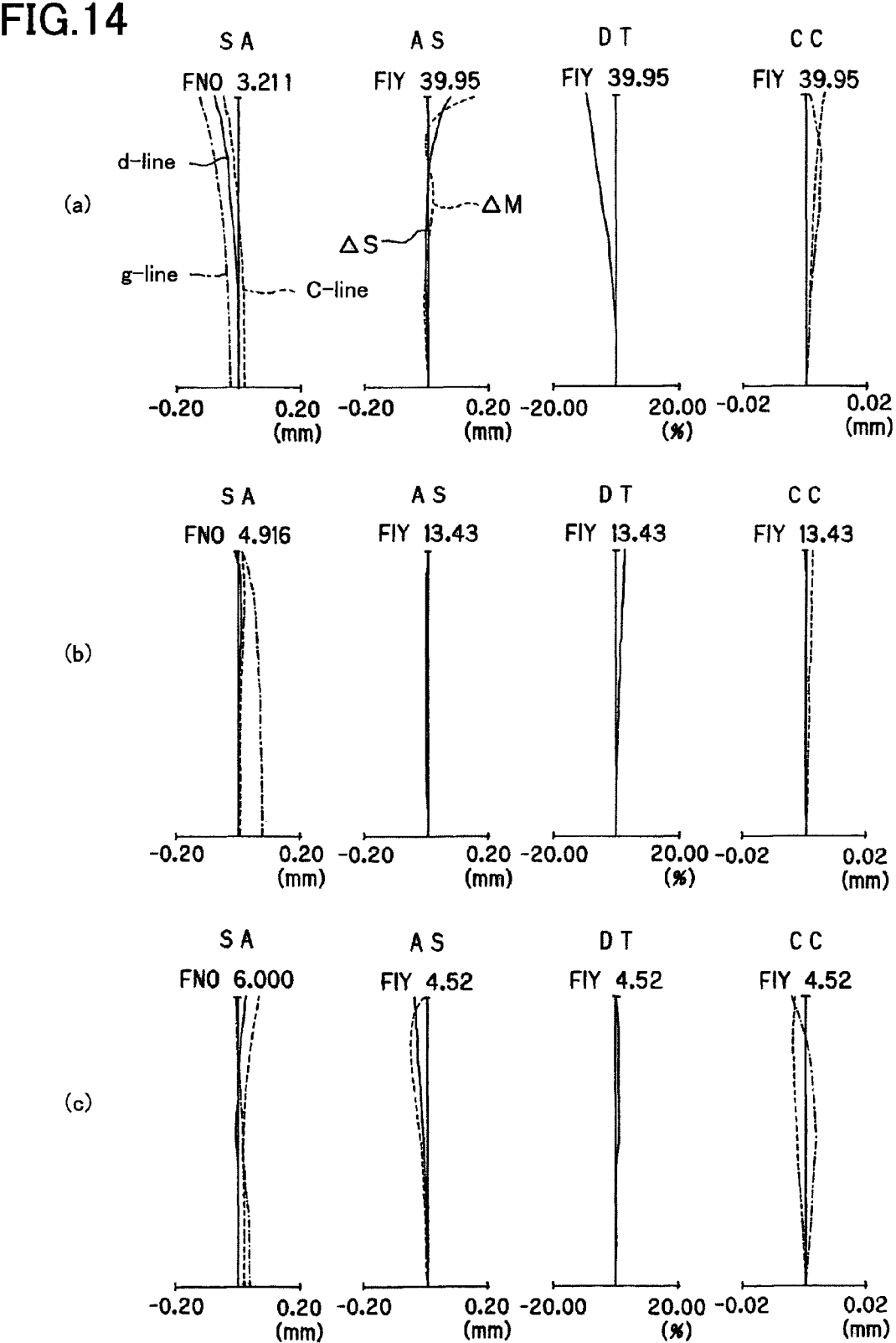
FIG. 14 is an aberration diagram for Example 6 upon focusing on an object point at infinity.
Figure 15:
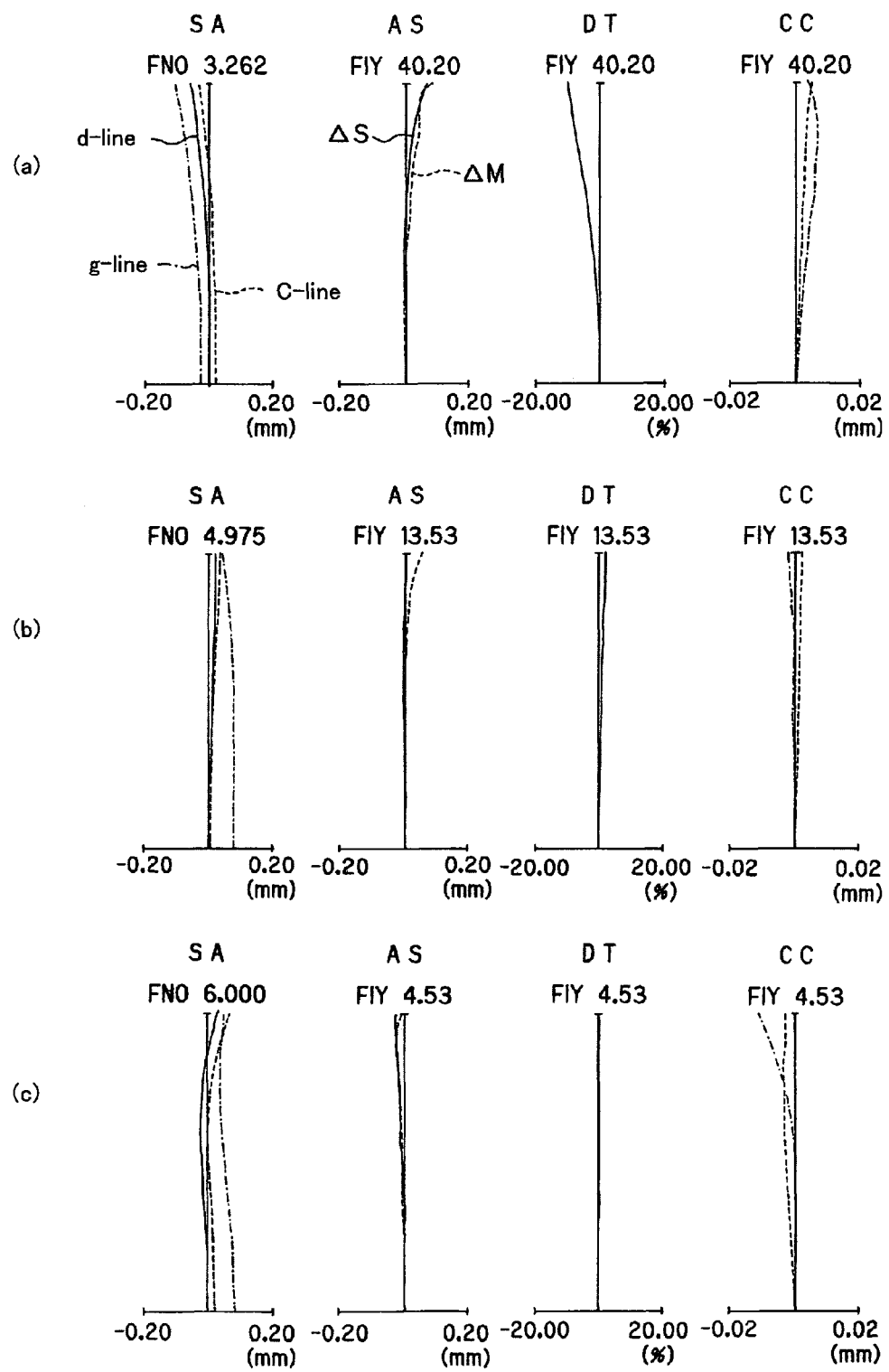
FIG. 15 is an aberration diagram for Example 7 upon focusing on an object point at infinity.
Figure 16:
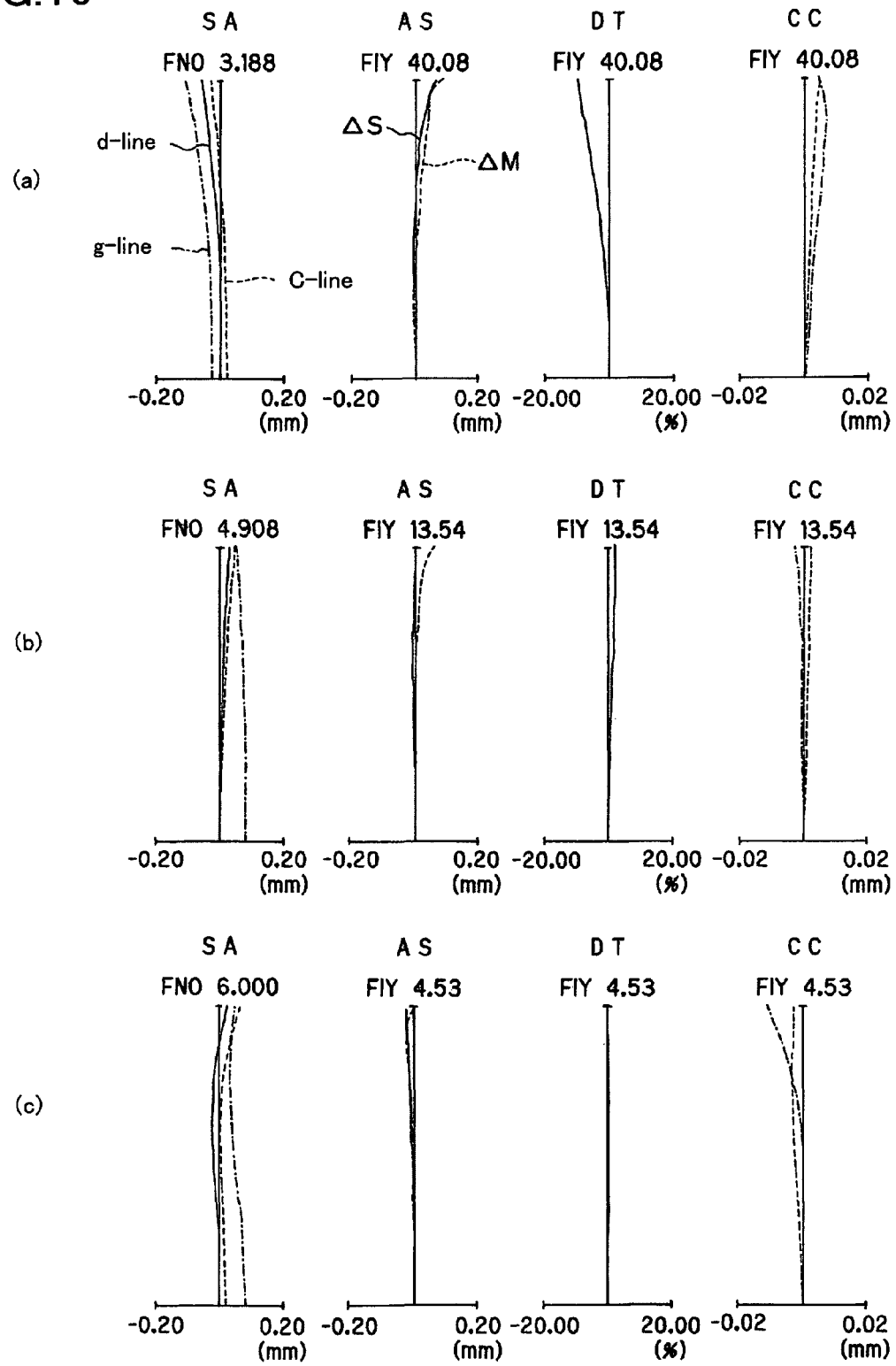
FIG. 16 is an aberration diagram for Example 8 upon focusing on an object point at infinity.

Example 8 is directed to a zoom lens made up of, in order from the object side, the first lens group G1 of positive refracting power, the second lens group G2 of negative refracting power, the aperture stop S, the third lens group G3 of positive refracting power and the fourth lens group G4 of positive refracting power, as shown in FIG. 8.

How the lens groups move upon zooming from the wide-angle end to the telephoto end is now explained.

From the wide-angle end to the telephoto end, the first lens group G1 moves toward the object side.

From the wide-angle end to the intermediate setting, the second lens group G2 moves toward the object side while the spacing between the first lens group G1 and it grows wide and the spacing between it and the third lens group G3 becomes narrow, and from the intermediate setting to the telephoto end, it moves toward the image side while the spacing between the first lens group G1 and it grows wide and the spacing between it and the third lens group G3 becomes narrow. In the intermediate setting, the second lens group G2 is positioned a little more on the object side than at the wide-angle end, and at the telephoto end, it is positioned a little more on the image side than at the wide-angle end.

From the wide-angle end to the telephoto end, the aperture stop S and the third lens group G3 move toward the object side while the spacing between the second lens group G2 and them becomes narrow and the spacing between them and the fourth lens group G4 grows wide.

From the wide-angle end to the telephoto end, the fourth lens group G4 moves toward the image side while the spacing between the third lens group G3 and it grows wide.

In order from the object side, the first lens group G1 is made up of a negative meniscus lens convex on its object side and a double-convex positive lens; the second lens group G2 is made up of a double-concave negative lens, a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the surface nearest to the image side of the cemented lens in the first lens group G1, two at both surfaces of the image-side double-concave negative lens in the second lens group G2, one at the image-side surface of the object-side double-concave negative lens in the second lens group G2, two at both surfaces of the double-convex positive lens in the third lens group G3, and two at both surfaces of the double-convex positive lens in the fourth lens group G4.

Set out below are the numerical data about the zoom lens of each example.

For Examples 11-20 similar in construction to Examples 1 to 10, there are only zoom lens data indicated.

Symbols mentioned hereinafter but not hereinbefore have the following meanings:
r is the radius of curvature of each lens surface,
d is the thickness of or spacing across each lens,
nd is the d-line refractive index of each lens,
vd is the d-line Abbe constant of each lens,
K is the conic coefficient,
A4, A6, A8, and A10 is the aspheric coefficients, and $E\pm n$ is $\times 10^{\pm n}$.

Note here that each aspheric shape is given by the following equation using each aspheric coefficient in each example.

$$Z = (Y^2/r) / \left[1 + \{1 - (K+1) \cdot (Y/r)^2\}^{1/2}\right] + A4 \times Y^4 + A6 \times Y^6 + A8 \times Y^8 + A10 \times Y^{10}$$

Here Z is the coordinates in the optical axis direction, and Y is the coordinates in the direction vertical to the optical axis.

Numerical Example 1

| Unit mm | | | | |
|---|---|---|---|---|
| Surface data | | | | |
| Surface No. | r | d | nd | vd |
| 1 | 26.666 | 0.80 | 1.92286 | 18.90 |
| 2 | 19.250 | 3.50 | 1.74320 | 49.34 |
| 3 (Aspheric surface) | −176.734 | Variable | | |
| 4 (Aspheric surface) | −40.959 | 0.80 | 1.80610 | 40.92 |
| 5 (Aspheric surface) | 5.528 | 2.69 | | |
| 6 | −1141.838 | 1.71 | 1.94595 | 17.98 |
| 7 | −10.862 | 0.70 | 1.80610 | 40.92 |
| 8 (Aspheric surface) | 134.158 | Variable | | |
| 9 (Stop) | ∞ | 0.30 | | |
| 10 (Aspheric surface) | 4.298 | 2.40 | 1.49700 | 81.54 |
| 11 (Aspheric surface) | −11.697 | 0.10 | | |
| 12 | 8.062 | 1.30 | 2.00170 | 20.64 |
| 13 (Aspheric surface) | 4.214 | Variable | | |
| 14 | 40.803 | 2.20 | 1.74320 | 49.34 |
| 15 (Aspheric surface) | −16.732 | Variable | | |
| 16 | ∞ | 0.40 | 1.54771 | 62.84 |
| 17 | ∞ | 0.50 | | |
| 18 | ∞ | 0.50 | 1.51633 | 64.14 |
| 19 | ∞ | 0.37 | | |
| Image plane | ∞ | | | |

-continued

| Unit mm |
|---|
| Aspheric surface data |

$3^{rd}$ surface

K = 0.000, A4 = 7.63091E−06, A6 = −4.82260E−09

$4^{th}$ surface

K = 0.000, A4 = 1.32148E−03, A6 = −5.72963E−05, A8 = 1.18744E−06, A10 = −1.03698E−08

$5^{th}$ surface

K = 0.000, A4 = 1.61134E−03, A6 = 2.28101E−05, A8 = −1.71055E−06, A10 = −1.22624E−09

$8^{th}$ surface

K = 0.000, A4 = −4.56444E−04, A6 = −9.41345E−06, A8 = −1.00141E−07, A10 = −2.44141E−10

$10^{th}$ surface

K = 0.000, A4 = −1.33244E−03, A6 = −5.69354E−05, A8 = −2.91994E−06, A10 = −7.27923E−08

$11^{th}$ surface

K = 0.000, A4 = −1.85420E−05, A6 = −2.18626E−05, A8 = 1.44977E−06, A10 = −2.94845E−08

$13^{th}$ surface

K = 0.000, A4 = 1.21796E−03, A6 = 9.52243E−05

$15^{th}$ surface

K = 0.000, A4 = 3.00000E−05

| Zoom lens data | | | |
|---|---|---|---|
| Zoom ratio | | 2.87 | |
| | wide-angle | intermediate | telephoto |
| Focal length | 5.07 | 14.80 | 48.79 |
| F-number | 3.50 | 5.24 | 6.00 |
| Angle of view | 77.72 | 28.31 | 9.15 |
| Image height | 3.88 | 3.88 | 3.88 |
| Total lens length | 37.84 | 50.08 | 64.46 |
| BF | 6.46 | 6.06 | 4.38 |
| d3 | 0.59 | 9.44 | 16.89 |
| d9 | 10.35 | 4.89 | 0.73 |
| d11 | 3.95 | 13.20 | 25.96 |
| d13 | 4.97 | 4.57 | 2.91 |

| Data on zoom lens groups | | |
|---|---|---|
| Group | Starting surface | Focal length |
| 1 | 1 | 34.03 |
| 2 | 5 | −6.36 |
| 3 | 10 | 10.21 |
| 4 | 12 | 16.15 |

Numerical Example 2

| Unit mm | | | | |
|---|---|---|---|---|
| Surface data | | | | |
| Surface No. | r | d | nd | vd |
| 1 | 16.468 | 0.60 | 1.94595 | 17.98 |
| 2 | 11.669 | 4.00 | 1.77250 | 49.60 |
| 3 (Aspheric surface) | −298.514 | Variable | | |
| 4 (Aspheric surface) | −35.694 | 0.50 | 1.83481 | 42.71 |
| 5 (Aspheric surface) | 5.250 | 1.50 | | |

-continued

Unit mm

| | | | | |
|---|---|---|---|---|
| 6 (Aspheric surface) | 41.185 | 0.50 | 1.77250 | 49.60 |
| 7 | 6.700 | 1.60 | 1.94595 | 17.98 |
| 8 | 21.527 | Variable | | |
| 9 (Stop) | ∞ | 0.30 | | |
| 10 (Aspheric surface) | 4.099 | 2.05 | 1.49700 | 81.54 |
| 11 (Aspheric surface) | −10.634 | 0.10 | | |
| 12 | 4.996 | 0.40 | 2.00170 | 20.64 |
| 13 | 3.471 | Variable | | |
| 14 (Aspheric surface) | −10.082 | 1.60 | 1.74320 | 49.34 |
| 15 (Aspheric surface) | −5.932 | Variable | | |
| 16 | ∞ | 0.30 | 1.54771 | 62.84 |
| 17 | ∞ | 0.30 | | |
| 18 | ∞ | 0.30 | 1.51633 | 64.14 |
| 19 | ∞ | 0.37 | | |
| Image plane | ∞ | | | |

Aspheric surface data $3^{rd}$ surface

K = 0.000, A4 = 2.79166E−05, A6 = −9.61223E−08
$4^{th}$ surface

K = 0.000, A4 = 6.02597E−04, A6 = −3.67937E−05, A8 = 9.10591E−07,
A10 = −7.79624E−09
$5^{th}$ surface K = 0.000, A4 = 6.24667E−04, A6 = 6.02647E−05, A8 = −2.20783E−06,
A10 = −1.71665E−08
$6^{th}$ surface K = 0.000, A4 = 9.33860E−04, A6 = 3.93633E−05
$10^{th}$ surface K = 0.000, A4 = −2.44420E−03, A6 = −1.76979E−05,
A8 = −3.79600E−06, A10 = −7.36605E−08
$11^{th}$ surface K = 0.000, A4 = 1.98650E−04, A6 = −4.57669E−05, A8 = 2.54073E−06,
A10 = −2.62988E−08
$14^{th}$ surface K = 0.000, A4 = 1.16049E−03, A6 = −2.06578E−05
$15^{th}$ surface

K = 0.000, A4 = 1.54681E−03, A6 = −7.33550E−07

Zoom lens data

| Zoom ratio | 2.87 | | |
|---|---|---|---|
| | wide-angle | intermediate | telephoto |
| Focal length | 5.10 | 14.24 | 48.56 |
| F-number | 6.01 | 8.67 | 11.00 |
| Angle of view | 77.92 | 27.89 | 9.39 |
| Image height | 3.88 | 3.88 | 3.88 |
| Total lens length | 32.91 | 40.53 | 41.14 |
| BF | 8.49 | 8.93 | 1.13 |
| d3 | 0.30 | 4.73 | 11.21 |
| d8 | 9.19 | 3.81 | 0.30 |
| d13 | 1.77 | 9.91 | 15.36 |
| d15 | 7.40 | 7.89 | 0.13 |

Data on zoom lens groups

| Group | Starting surface | Focal length |
|---|---|---|
| 1 | 1 | 22.14 |
| 2 | 5 | −5.32 |
| 3 | 10 | 9.37 |
| 4 | 12 | 16.56 |

Numerical Example 3

Unit mm

Surface data

| Surface No. | r | d | nd | νd |
|---|---|---|---|---|
| 1 | 20.909 | 0.80 | 2.00170 | 20.64 |
| 2 | 16.720 | 3.62 | 1.61881 | 63.85 |
| 3 (Aspheric surface) | −99.283 | Variable | | |
| 4 (Aspheric surface) | −76.528 | 0.80 | 1.83481 | 42.71 |
| 5 (Aspheric surface) | 7.133 | 2.58 | | |
| 6 | −206.923 | 1.63 | 2.10225 | 16.79 |
| 7 | −18.640 | 0.80 | 1.83481 | 42.71 |
| 8 (Aspheric surface) | 54.142 | Variable | | |
| 9 (Stop) | ∞ | 0.30 | | |
| 10 (Aspheric surface) | 5.593 | 2.49 | 1.69350 | 53.21 |
| 11 (Aspheric surface) | −19.473 | 0.08 | | |
| 12 | 5.572 | 1.46 | 1.49700 | 81.54 |
| 13 | 37.089 | 0.71 | 2.00330 | 28.27 |
| 14 | 3.573 | Variable | | |
| 15 (Aspheric surface) | 32.825 | 3.00 | 1.74330 | 49.33 |
| 16 (Aspheric surface) | −14.479 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane | ∞ | | | |

Aspheric surface data $3^{rd}$ surface

K = 0.000, A4 = 1.14689E−05, A6 = 4.83606E−09, A8 = −2.02752E−10,
A10 = 7.85884E−13
$4^{th}$ surface K = 9.178, A4 = 8.86386E−05, A6 = −2.97753E−06, A8 = 4.62415E−08,
A10 = −3.04205E−10
$5^{th}$ surface K = 0.265, A4 = 1.50448E−04, A6 = 6.43712E−06, A8 = −2.33528E−07,
A10 = −2.66160E−09
$8^{th}$ surface K = −1.493, A4 = −3.07535E−04, A6 = −4.47187E−06,
A8 = 2.37774E−07, A10 = −5.43727E−09
$10^{th}$ surface K = 0.822, A4 = −1.07173E−03, A6 = −3.12892E−05,
A8 = −1.48549E−06, A10 = −1.40758E−08
$11^{th}$ surface K = −3.282, A4 = 4.48842E−04, A6 = 3.09551E−06,
A8 = −8.51889E−07, A10 = 1.92356E−07
$15^{th}$ surface K = 0.000, A4 = 3.25911E−05, A6 = 1.49778E−07
$16^{th}$ surface

K = 0.000, A4 = 1.36486E−04, A6 = −4.26236E−06, A8 = 7.39509E−08

Zoom lens data

| Zoom ratio | 2.87 | | |
|---|---|---|---|
| | wide-angle | intermediate | telephoto |
| Focal length | 5.14 | 15.85 | 49.07 |
| F-number | 3.22 | 4.92 | 6.00 |
| Angle of view | 80.40 | 26.86 | 9.00 |
| Image height | 3.88 | 3.88 | 3.88 |
| Total lens length | 42.87 | 51.96 | 57.58 |
| BF | 5.44 | 5.15 | 4.75 |
| d3 | 0.18 | 8.37 | 16.20 |
| d8 | 16.03 | 8.55 | 1.75 |
| d14 | 2.97 | 11.62 | 16.62 |
| d16 | 3.93 | 3.71 | 3.30 |

-continued

Unit mm

Data on zoom lens groups

| Group | Starting surface | Focal length |
|---|---|---|
| 1 | 1 | 32.05 |
| 2 | 5 | −7.25 |
| 3 | 10 | 10.94 |
| 4 | 12 | 13.89 |

Numerical Example 4

Unit mm

Surface data

| Surface No. | r | d | nd | vd |
|---|---|---|---|---|
| 1 | 20.015 | 0.80 | 2.00170 | 20.64 |
| 2 | 16.318 | 3.62 | 1.59201 | 67.02 |
| 3 (Aspheric surface) | −95.128 | Variable | | |
| 4 (Aspheric surface) | −72.309 | 0.80 | 1.83481 | 42.71 |
| 5 (Aspheric surface) | 7.089 | 2.58 | | |
| 6 | −222.779 | 1.64 | 2.10225 | 16.79 |
| 7 | −18.442 | 0.80 | 1.83481 | 42.71 |
| 8 (Aspheric surface) | 56.401 | Variable | | |
| 9 (Stop) | ∞ | 0.30 | | |
| 10 (Aspheric surface) | 5.596 | 2.49 | 1.69350 | 53.21 |
| 11 (Aspheric surface) | −19.119 | 0.08 | | |
| 12 | 5.586 | 1.46 | 1.49700 | 81.54 |
| 13 | 38.700 | 0.71 | 2.00330 | 28.27 |
| 14 | 3.565 | Variable | | |
| 15 (Aspheric surface) | 33.330 | 3.00 | 1.74330 | 49.33 |
| 16 (Aspheric surface) | −14.041 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane | ∞ | | | |

Aspheric surface data $3^{rd}$ surface

K = 0.000, A4 = 1.25893E−05, A6 = 5.29224E−09, A8 = −2.09551E−10, A10 = 7.93834E−13

$4^{th}$ surface

K = 7.869, A4 = 6.69751E−05, A6 = −2.58449E−06, A8 = 6.22145E−08, A10 = −5.23773E−10

$5^{th}$ surface

K = 0.227, A4 = 1.07973E−04, A6 = 6.32093E−06, A8 = −5.41685E−07, A10 = 1.70854E−08

$8^{th}$ surface

K = −1.493, A4 = −3.10021E−04, A6 = 5.60758E−07, A8 = −8.83358E−08, A10 = −2.21573E−09

$10^{th}$ surface

K = 0.822, A4 = −1.11343E−03, A6 = −3.05892E−05, A8 = −1.85139E−06, A10 = −1.78845E−08

$11^{th}$ surface

K = −2.814, A4 = 4.08676E−04, A6 = −1.21638E−06, A8 = −7.04762E−07, A10 = 1.50032E−07

$15^{th}$ surface

K = 0.000, A4 = 4.74683E−05, A6 = −7.77189E−07

$16^{th}$ surface

K = 0.000, A4 = 1.67236E−04, A6 = −5.05549E−06, A8 = 6.48089E−08

-continued

Unit mm

Zoom lens data

| Zoom ratio | | 2.87 | |
|---|---|---|---|
| | wide-angle | intermediate | telephoto |
| Focal length | 5.11 | 15.78 | 48.99 |
| F-number | 3.24 | 4.95 | 6.00 |
| Angle of view | 80.45 | 26.99 | 9.02 |
| Image height | 3.88 | 3.88 | 3.88 |
| Total lens length | 42.85 | 51.98 | 57.55 |
| BF | 5.43 | 5.17 | 4.72 |
| d3 | 0.18 | 8.37 | 16.20 |
| d8 | 16.03 | 8.55 | 1.74 |
| d14 | 2.96 | 11.63 | 16.63 |
| d16 | 3.93 | 3.73 | 3.25 |

Data on zoom lens groups

| Group | Starting surface | Focal length |
|---|---|---|
| 1 | 1 | 32.03 |
| 2 | 5 | −7.26 |
| 3 | 10 | 10.97 |
| 4 | 12 | 13.59 |

Numerical Example 5

Unit mm

Surface data

| Surface No. | r | d | nd | vd |
|---|---|---|---|---|
| 1 | 24.303 | 0.60 | 1.94595 | 17.98 |
| 2 | 20.214 | 3.77 | 1.59201 | 67.02 |
| 3 (Aspheric surface) | −81.890 | Variable | | |
| 4 (Aspheric surface) | −126.121 | 0.80 | 1.85135 | 40.10 |
| 5 (Aspheric surface) | 7.298 | 2.55 | | |
| 6 | −47.821 | 1.82 | 1.94595 | 17.98 |
| 7 | −12.243 | 0.70 | 1.77377 | 47.17 |
| 8 (Aspheric surface) | 1048.205 | Variable | | |
| 9 (Stop) | ∞ | 0.00 | | |
| 10 (Aspheric surface) | 4.740 | 2.61 | 1.59201 | 67.02 |
| 11 (Aspheric surface) | −24.526 | 0.10 | | |
| 12 | 8.362 | 1.56 | 1.49700 | 81.54 |
| 13 | −11.267 | 0.42 | 1.62004 | 36.26 |
| 14 | 3.425 | Variable | | |
| 15 (Aspheric surface) | 23.304 | 2.94 | 1.58913 | 61.14 |
| 16 (Aspheric surface) | −14.592 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane | ∞ | | | |

Aspheric surface data $3^{rd}$ surface

K = 0.000, A4 = 9.98895E−06, A6 = −1.42502E−08, A8 = 1.40262E−10, A10 = −7.79860E−13

$4^{th}$ surface

K = 0.000, A4 = 1.42993E−05, A6 = −3.36962E−06, A8 = 6.97681E−08, A10 = −5.69362E−10

$5^{th}$ surface

K = 0.028, A4 = 2.04098E−04, A6 = −1.50503E−06, A8 = 1.91466E−07, A10 = −1.44606E−08

$8^{th}$ surface

-continued

Unit mm

K = 0.104, A4 = −3.08161E−04, A6 = −3.71109E−06,
A8 = 1.80523E−07
10th surface

K = 0.000, A4 = −4.81405E−04, A6 = 6.75956E−06,
A8 = −4.24430E−07, A10 = 3.05963E−07
11th surface K = 0.000, A4 = 1.00467E−03, A6 = 4.70567E−05, A8 = −1.92213E−06,
A10 = 8.59706E−07
15th surface K = 0.163, A4 = 1.85121E−05, A6 = 4.98422E−06, A8 = −8.22837E−07,
A10 = 1.70212E−08
16th surface K = 0.027, A4 = 3.00013E−05, A6 = 1.96174E−06, A8 = −7.90283E−07,
A10 = 1.71060E−08

Zoom lens data

| Zoom ratio | | 2.87 | |
| --- | --- | --- | --- |
| | wide-angle | intermediate | telephoto |
| Focal length | 5.12 | 16.02 | 49.23 |
| F-number | 3.30 | 5.51 | 6.00 |
| Angle of view | 79.85 | 27.06 | 9.00 |
| Image height | 3.88 | 3.88 | 3.88 |
| Total lens length | 41.88 | 53.53 | 58.82 |
| BF | 6.32 | 4.30 | 4.79 |
| d3 | 0.30 | 8.76 | 18.86 |
| d8 | 15.57 | 8.95 | 1.47 |
| d14 | 1.81 | 13.63 | 15.82 |
| d16 | 4.81 | 2.89 | 3.30 |

Data on zoom lens groups

| Group | Starting surface | Focal length |
| --- | --- | --- |
| 1 | 1 | 35.22 |
| 2 | 5 | −7.67 |
| 3 | 10 | 11.44 |
| 4 | 12 | 15.68 |

Numerical Example 6

Unit mm

Surface data

| Surface No. | r | d | nd | νd |
| --- | --- | --- | --- | --- |
| 1 | 20.846 | 0.80 | 2.00170 | 20.64 |
| 2 | 16.766 | 0.10 | | |
| 3 | 16.944 | 3.62 | 1.61881 | 63.85 |
| 4 (Aspheric surface) | −97.907 | Variable | | |
| 5 (Aspheric surface) | −77.096 | 0.80 | 1.83481 | 42.71 |
| 6 (Aspheric surface) | 7.139 | 2.58 | | |
| 7 | −210.704 | 1.63 | 2.10225 | 16.79 |
| 8 | −18.613 | 0.80 | 1.83481 | 42.71 |
| 9 (Aspheric surface) | 54.391 | Variable | | |
| 10 (Stop) | ∞ | 0.30 | | |
| 11 (Aspheric surface) | 5.591 | 2.49 | 1.69350 | 53.21 |
| 12 (Aspheric surface) | −19.444 | 0.08 | | |
| 13 | 5.570 | 1.46 | 1.49700 | 81.54 |
| 14 | 36.999 | 0.71 | 2.00330 | 28.27 |
| 15 | 3.573 | Variable | | |
| 16 (Aspheric surface) | 32.909 | 3.00 | 1.74330 | 49.33 |
| 17 (Aspheric surface) | −14.495 | Variable | | |
| 18 | ∞ | 0.40 | 1.54771 | 62.84 |
| 19 | ∞ | 0.50 | | |

-continued

Unit mm

| 20 | ∞ | 0.50 | 1.51633 | 64.14 |
| --- | --- | --- | --- | --- |
| 21 | ∞ | 0.37 | | |
| Image plane | ∞ | | | |

Aspheric surface data

4th surface

K = 0.000, A4 = 1.11417E−05, A6 = 4.77301E−09, A8 = −1.76384E−10,
A10 = 5.67505E−13
5th surface K = 9.178, A4 = 8.69795E−05, A6 = −1.63148E−06, A8 = 8.03659E−09,
A10 = −1.24224E−11
6th surface K = 0.265, A4 = 1.50147E−04, A6 = 7.13726E−06, A8 = −8.18039E−08,
A10 = −8.56450E−09
9th surface K = −1.493, A4 = −3.05420E−04, A6 = −3.72321E−06,
A8 = 1.95408E−07, A10 = −4.53534E−09
11th surface K = 0.822, A4 = −1.07795E−03, A6 = −3.09591E−05,
A8 = −1.21284E−06, A10 = 1.00402E−08
12th surface K = −3.118, A4 = 4.44583E−04, A6 = 4.62513E−06,
A8 = −3.41403E−07, A10 = 2.10091E−07
16th surface K = 0.000, A4 = 3.25824E−05, A6 = 4.25516E−07
17th surface

K = 0.000, A4 = 1.37067E−04, A6 = −4.13492E−06, A8 = 7.46073E−08

Zoom lens data

| Zoom ratio | | 2.87 | |
| --- | --- | --- | --- |
| | wide-angle | intermediate | telephoto |
| Focal length | 5.12 | 15.83 | 48.93 |
| F-number | 3.21 | 4.92 | 6.00 |
| Angle of view | 79.98 | 26.88 | 9.04 |
| Image height | 3.88 | 3.88 | 3.88 |
| Total lens length | 42.93 | 51.97 | 57.60 |
| BF | 5.40 | 5.06 | 4.68 |
| d4 | 0.18 | 8.37 | 16.20 |
| d9 | 16.03 | 8.55 | 1.75 |
| d15 | 2.97 | 11.62 | 16.62 |
| d17 | 3.90 | 3.62 | 3.22 |

Data on zoom lens groups

| Group | Starting surface | Focal length |
| --- | --- | --- |
| 1 | 1 | 32.05 |
| 2 | 5 | −7.27 |
| 3 | 10 | 10.91 |
| 4 | 12 | 13.85 |

Numerical Example 7

Unit mm

Surface data

| Surface No. | r | d | nd | νd |
| --- | --- | --- | --- | --- |
| 1 | 19.302 | 0.80 | 2.00170 | 20.64 |
| 2 | 15.365 | 3.62 | 1.58913 | 61.14 |

-continued

Unit mm

| | | | | |
|---|---|---|---|---|
| 3 (Aspheric surface) | −104.689 | Variable | | |
| 4 (Aspheric surface) | −93.884 | 0.80 | 1.83481 | 42.71 |
| 5 (Aspheric surface) | 6.716 | 2.58 | | |
| 6 | −700.605 | 1.68 | 2.10225 | 16.79 |
| 7 | −19.733 | 0.10 | | |
| 8 | −17.664 | 0.80 | 1.83481 | 42.71 |
| 9 (Aspheric surface) | 95.016 | Variable | | |
| 10 (Stop) | ∞ | 0.30 | | |
| 11 (Aspheric surface) | 5.420 | 2.49 | 1.69350 | 53.21 |
| 12 (Aspheric surface) | −19.583 | 0.08 | | |
| 13 | 5.498 | 1.46 | 1.49700 | 81.54 |
| 14 | 34.975 | 0.54 | 2.00330 | 28.27 |
| 15 | 3.525 | Variable | | |
| 16 (Aspheric surface) | 39.743 | 3.00 | 1.74330 | 49.33 |
| 17 (Aspheric surface) | −13.961 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.37 | | |
| Image plane | ∞ | | | |

Aspheric surface data $3^{rd}$ surface

K = 0.000, A4 = 1.23054E−05, A6 = 2.60212E−09, A8 = −3.07823E−10,
A10 = 1.71458E−12
$4^{th}$ surface K = 7.869, A4 = 3.85724E−05, A6 = −1.69314E−06, A8 = 4.09224E−08,
A10 = −3.42105E−10
$5^{th}$ surface K = 0.227, A4 = 4.89518E−05, A6 = 5.35203E−06, A8 = −5.51299E−07,
A10 = 1.60553E−08
$9^{th}$ surface K = −1.493, A4 = −3.26017E−04, A6 = 9.90185E−07,
A8 = −1.35284E−07, A10 = −1.79042E−09
$11^{th}$ surface K = 0.781, A4 = −1.18366E−03, A6 = −2.67284E−05,
A8 = −2.83249E−06, A10 = 2.20918E−08
$12^{th}$ surface K = −2.672, A4 = 4.44282E−04, A6 = 1.65015E−05,
A8 = −3.53535E−06, A10 = 3.82848E−07
$16^{th}$ surface K = 0.000, A4 = 5.39933E−05, A6 = −2.94851E−06
$17^{th}$ surface

K = 0.000, A4 = 1.52333E−04, A6 = −7.37192E−06, A8 = 8.02981E−08

Zoom lens data

| Zoom ratio | | 2.87 | |
|---|---|---|---|
| | wide-angle | intermediate | telephoto |
| Focal length | 5.12 | 15.83 | 49.08 |
| F-number | 3.26 | 4.97 | 6.00 |
| Angle of view | 80.46 | 27.07 | 9.06 |
| Image height | 3.88 | 3.88 | 3.88 |
| Total lens length | 42.91 | 51.75 | 57.66 |
| BF | 5.49 | 5.17 | 4.74 |
| d3 | 0.18 | 8.28 | 16.32 |
| d9 | 16.03 | 8.34 | 1.61 |
| d15 | 2.98 | 11.72 | 16.76 |
| d17 | 4.00 | 3.73 | 3.27 |

Data on zoom lens groups

| Group | Starting surface | Focal length |
|---|---|---|
| 1 | 1 | 32.45 |
| 2 | 5 | −7.30 |

-continued

Unit mm

| | | |
|---|---|---|
| 3 | 10 | 10.95 |
| 4 | 12 | 14.17 |

Numerical Example 8

Unit mm

Surface data

| Surface No. | r | d | nd | vd |
|---|---|---|---|---|
| 1 | 19.671 | 0.80 | 2.00170 | 20.64 |
| 2 | 15.603 | 0.10 | | |
| 3 | 15.450 | 3.62 | 1.58913 | 61.14 |
| 4 (Aspheric surface) | −100.545 | Variable | | |
| 5 (Aspheric surface) | −84.986 | 0.80 | 1.83481 | 42.71 |
| 6 (Aspheric surface) | 6.782 | 2.58 | | |
| 7 | 20800.198 | 1.65 | 2.10225 | 16.79 |
| 8 | −20.211 | 0.10 | | |
| 9 | −17.058 | 0.80 | 1.83481 | 42.71 |
| 10 (Aspheric surface) | 114.384 | Variable | | |
| 11 (Stop) | ∞ | 0.30 | | |
| 12 (Aspheric surface) | 5.434 | 2.49 | 1.69350 | 53.21 |
| 13 (Aspheric surface) | −19.397 | 0.08 | | |
| 14 | 5.474 | 1.46 | 1.49700 | 81.54 |
| 15 | 33.364 | 0.52 | 2.00330 | 28.27 |
| 16 | 3.517 | Variable | | |
| 17 (Aspheric surface) | 40.792 | 2.99 | 1.74330 | 49.33 |
| 18 (Aspheric surface) | −13.902 | Variable | | |
| 19 | ∞ | 0.40 | 1.54771 | 62.84 |
| 20 | ∞ | 0.50 | | |
| 21 | ∞ | 0.50 | 1.51633 | 64.14 |
| 22 | ∞ | 0.37 | | |
| Image plane | ∞ | | | |

Aspheric surface data $4^{th}$ surface

K = 0.000, A4 = 1.29756E−05, A6 = 6.43761E−09, A8 = −3.58863E−10,
A10 = 2.03026E−12
$5^{th}$ surface K = 7.869, A4 = 8.02051E−05, A6 = −2.23965E−06, A8 = 3.94995E−08,
A10 = −3.00060E−10
$6^{th}$ surface K = 0.227, A4 = 7.38440E−05, A6 = 6.33121E−06, A8 = −4.73985E−07,
A10 = 1.42758E−08
$10^{th}$ surface K = −1.493, A4 = −3.07032E−04, A6 = −8.00912E−07,
A8 = −8.47630E−08, A10 = −2.11918E−09
$12^{th}$ surface K = 0.781, A4 = −1.18705E−03, A6 = −2.86980E−05,
A8 = −2.73106E−06, A10 = −5.40040E−09
$13^{th}$ surface K = −2.671, A4 = 4.20020E−04, A6 = 1.36038E−05,
A8 = −3.42454E−06, A10 = 3.29100E−07
$17^{th}$ surface K = 0.000, A4 = 5.57926E−05, A6 = −2.76078E−06
$18^{th}$ surface

K = 0.000, A4 = 1.63767E−04, A6 = −7.83584E−06, A8 = 9.06245E−08

-continued

Unit mm

Zoom lens data

Zoom ratio 2.87

| | wide-angle | intermediate | telephoto |
|---|---|---|---|
| Focal length | 5.12 | 15.82 | 49.12 |
| F-number | 3.19 | 4.91 | 6.00 |
| Angle of view | 80.22 | 27.08 | 9.06 |
| Image height | 3.88 | 3.88 | 3.88 |
| Total lens length | 42.99 | 51.80 | 57.66 |
| BF | 5.51 | 5.18 | 4.72 |
| d4 | 0.18 | 8.26 | 16.33 |
| d10 | 16.03 | 8.33 | 1.58 |
| d16 | 2.99 | 11.75 | 16.76 |
| d18 | 3.65 | 3.37 | 2.88 |

Data on zoom lens groups

| Group | Starting surface | Focal length |
|---|---|---|
| 1 | 1 | 32.39 |
| 2 | 5 | −7.32 |
| 3 | 10 | 10.96 |
| 4 | 12 | 14.21 |

Numerical Example 9

Unit mm
Zoom lens data
Zoom ratio 2.87

| | wide-angle | intermediate | telephoto |
|---|---|---|---|
| Focal length | 5.07 | 14.80 | 48.79 |
| F-number | 3.50 | 5.24 | 6.00 |
| Angle of view | 38.57 | 14.06 | 4.54 |
| Image height | 3.84 | 3.85 | 3.85 |

Numerical Example 10

Unit mm
Zoom lens data
Zoom ratio 2.87

| | wide-angle | intermediate | telephoto |
|---|---|---|---|
| Focal length | 5.10 | 14.24 | 48.56 |
| F-number | 6.01 | 8.67 | 11.00 |
| Angle of view | 38.20 | 13.73 | 4.63 |
| Image height | 3.79 | 3.81 | 3.83 |

Numerical Example 11

Unit mm
Zoom lens data
Zoom ratio 2.87

| | wide-angle | intermediate | telephoto |
|---|---|---|---|
| Focal length | 5.14 | 15.85 | 49.07 |
| F-number | 3.22 | 4.92 | 6.00 |
| Angle of view | 38.82 | 13.38 | 4.49 |
| Image height | 3.71 | 3.86 | 3.87 |

Numerical Example 12

Unit mm
Zoom lens data
Zoom ratio 2.87

| | wide-angle | intermediate | telephoto |
|---|---|---|---|
| Focal length | 5.11 | 15.78 | 48.99 |
| F-number | 3.24 | 4.95 | 6.00 |
| Angle of view | 38.87 | 13.45 | 4.50 |
| Image height | 3.71 | 3.87 | 3.87 |

Numerical Example 13

Unit mm
Zoom lens data
Zoom ratio 2.87

| | wide-angle | intermediate | telephoto |
|---|---|---|---|
| Focal length | 5.12 | 16.02 | 49.23 |
| F-number | 3.30 | 5.51 | 6.00 |
| Angle of view | 38.83 | 13.49 | 4.50 |
| Image height | 3.74 | 3.87 | 3.88 |

Numerical Example 14

Unit mm
Zoom lens data
Zoom ratio 2.87

| | wide-angle | intermediate | telephoto |
|---|---|---|---|
| Focal length | 5.12 | 15.83 | 48.93 |
| F-number | 3.21 | 4.92 | 6.00 |
| Angle of view | 38.83 | 13.49 | 4.51 |
| Image height | 3.74 | 3.86 | 3.87 |

Numerical Example 15

Unit mm
Zoom lens data
Zoom ratio 2.87

|  | wide-angle | intermediate | telephoto |
|---|---|---|---|
| Focal length | 5.12 | 15.83 | 49.08 |
| F-number | 3.26 | 4.97 | 6.00 |
| Angle of view | 38.82 | 13.49 | 4.53 |
| Image height | 3.71 | 3.87 | 3.88 |

Numerical Example 16

Unit mm
Zoom lens data
Zoom ratio 2.87

|  | wide-angle | intermediate | telephoto |
|---|---|---|---|
| Focal length | 5.12 | 15.82 | 49.12 |
| F-number | 3.19 | 4.91 | 6.00 |
| Angle of view | 38.77 | 13.50 | 4.53 |
| Image height | 3.72 | 3.87 | 3.88 |

FIGS. 9 to 16 are aberration diagrams for Examples 1-8 upon focusing on an object point at infinity. In these aberration diagrams, (a), (b) and (c) are indicative of spherical aberrations, astigmatism, distortion and chromatic aberration of magnification at the wide-angle end, in the intermediate state, and at the telephoto end, respectively, and FIY stands for a half angle of view. Note here that there are no aberration diagrams for Examples 9-16 attached hereto because they are similar in construction to Examples 1-8, respectively.

Tabulated below are the values of conditions (1) to (8) in Examples 1-8.

| Condition | Ex. 1 | Ex. 2 | Ex. 3 | Ex. 4 |
|---|---|---|---|---|
| (1) | 15.15 | 10.82 | 15.06 | 15.29 |
| (2) | 1.0~4.0 | 1.0~4.0 | 1.0~4.0 | 1.0~4.0 |
| (3) | 9.63 | 9.51 | 9.55 | 9.58 |
| (4) | −9.35 | −11.71 | −10.50 | −10.43 |
| (5) | 5.81 | −0.89 | 4.56 | 4.86 |
| (6) | 0.33 | 0.34 | 0.28 | 0.28 |
| (7) | −0.42 | −3.86 | −0.39 | −0.41 |
| (8) | 0.46 | 0.44 | 0.55 | 0.55 |
| Condition | Ex. 5 | Ex. 6 | Ex. 7 | Ex. 8 |
| (1) | 15.16 | 15.13 | 14.91 | 14.82 |
| (2) | 1.0~4.0 | 1.0~4.0 | 1.0~4.0 | 1.0~4.0 |
| (3) | 9.61 | 9.55 | 9.59 | 9.59 |
| (4) | −12.19 | −10.53 | −10.54 | −10.52 |
| (5) | 2.97 | 4.61 | 4.38 | 4.30 |
| (6) | 0.32 | 0.28 | 0.29 | 0.29 |
| (7) | −0.23 | −0.39 | −0.48 | −0.49 |
| (8) | 0.68 | 0.55 | 0.57 | 0.56 |

Each example may be modified as follows.

In the zoom lens of each example, barrel distortion is produced on the rectangular photoelectric transformation plane at the wide-angle end, while the occurrence of distortion is hold back near the intermediate focal length or at the telephoto end. For electrical correction of distortion, the effective imaging area should preferably be configured into barrel form at the wide-angle end and rectangular form near the intermediate focal length or at the telephoto end. And the predetermined effective imaging area is transformed by image processing into rectangular image information with reduced distortion. The image height $I_{mw}$ at the wide-angle end is less than the image height $I_{ms}$ in the intermediate focal length state or the image height $I_{mt}$ at the telephoto end.

Preferably, the zoom lens has an image transformation block in which electric signals for an image taken through the zoom lens are transformed into image signals that are corrected by image processing for color shifts from chromatic aberration of magnification. Electric correction of the zoom lens for chromatic aberration of magnification is going to make sure much better images are obtained.

Generally speaking, an electronic still camera is designed such that the image of a subject is separated into three primary colors images: the first, the second and the third primary color image, so that the respective output signals are superposed one upon another by operation to reconstruct a color image. Suppose here that a zoom lens has chromatic aberration of magnification. Then, given an image from light of the first primary color, the positions where light of the second and the third primary color is imaged are going to be off the position where the light of the first primary color is imaged. For electronic correction of the image for chromatic aberration of magnification, the amount of shifts of the imaging positions for the second and the third primary color from that for the first primary color is previously found for each pixel of an imaging device based on aberration information about the zoom lens. Then, coordination transformation is implemented such that only the amount of the shifts from the first primary color is corrected for each pixel of the taken image.

Referring typically to an image made up of three primary colors output signals of red (R), green (G) and blue (B), shifts of the imaging positions R and B from G are first found for each pixel. Then, coordination transformation is applied to the taken image to eliminate any shift from G, and finally signals of R and G are produced.

Chromatic aberration of magnification varies with zoom, focus and f numbers; it is preferable that the amount of shifts of the second and the third primary color from the first primary color is stored as correction data in a storage device for each lens position (zoom, focus and f numbers). By referring to this correction data depending on the zoom position, it is possible to produce the second and the third primary color signals that are corrected for the shifts of the second and the third primary color from the first primary color signal.

To cut off unessential light such as ghosts and flares, it is acceptable to rely on a flare stop other than the aperture stop.

That flare stop may then be located somewhere on the object side of the first lens group, between the first and the second lens group, between the second and the third lens group, between the third and the fourth lens group, between the fourth and the fifth lens group, and between the group nearest to the image plane side and the image plane. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multicoating is then desired because of being capable of effectively reducing ghosts and flares. Each lens, a cover glass or the like may just as well be applied with an infrared cut coating.

Desirously, focusing for the adjusting the focus is implemented with the lens group nearest to the image plane side. Focusing with that lens group eases off loads on a motor because the lens weight is light, and works for making the lens barrel compact because there is none of the change in the total length during zooming, and a drive motor is mounted in the lens barrel.

As noted just above, it is desired that focusing is implemented with the lens group nearest to the image plane side; however, it may be implemented with the first, the second, the third or the fourth lens group, or by the movement of multiple lens groups. The movement of multiple lens groups is more effectively capable of holding back deterioration of the performance in association with focusing. Furthermore, focusing may be implemented by letting out the whole lens system or letting out or in some lenses.

The shading of brightness at the peripheral portion of an image may be reduced by shifting the mircolenses of a CCD. For instance, the CCD microlens design may be modified in conformity with the angle of incidence of light rays at each image height, or decreases in the quantity of light at the peripheral position of the image may be corrected by image processing.

An antireflection coating is generally applied to the air contact surface of a lens for the purpose of preventing ghosts and flares. At the cementing surface of a cemented lens, on the other hand, the refractive index of an adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, which could in turn make sure images of better quality.

Especially in recent years, vitreous materials having high refractive indices have gained popularity, and they have often been used with camera optical systems for the reasons of their enhanced effect on correction of aberrations. When a high-refractive-index vitreous material is used as a cemented lens, however, the reflection of light off the cementing surface would also be not negligible. In such a case, it would be particularly effective to have an antireflection coating applied on the cementing surface.

Effective use of cementing surface coating is disclosed in JP(A) s 2-27301, 2001-324676 and 2005-92115 and U.S. Pat. No. 7,116,482, etc. In those publications, there is the particular mention of the cementing lens surface coating in the first lens group of the zoom lens having positive power at the foremost lens group. In the invention, too, the cementing lens surface in the first lens group of positive power may just as well be coated, as set forth there.

Depending on the refractive index of the lens involved and the refractive index of the adhesive material used, use may be made of coating materials of relatively high refractive indices such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive indices such as $MgF_2$, $SiO_2$, and $Al_2O_3$. These coating materials may then have a suitable thickness selected in such a way as to meet phase conditions. As a matter of course, the cementing surface coating may just as well be multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc. On the base of a similar idea, cementing surface coating can effectively be applied to lens cementing surfaces other than those in the first lens group, too.

Figure 17:
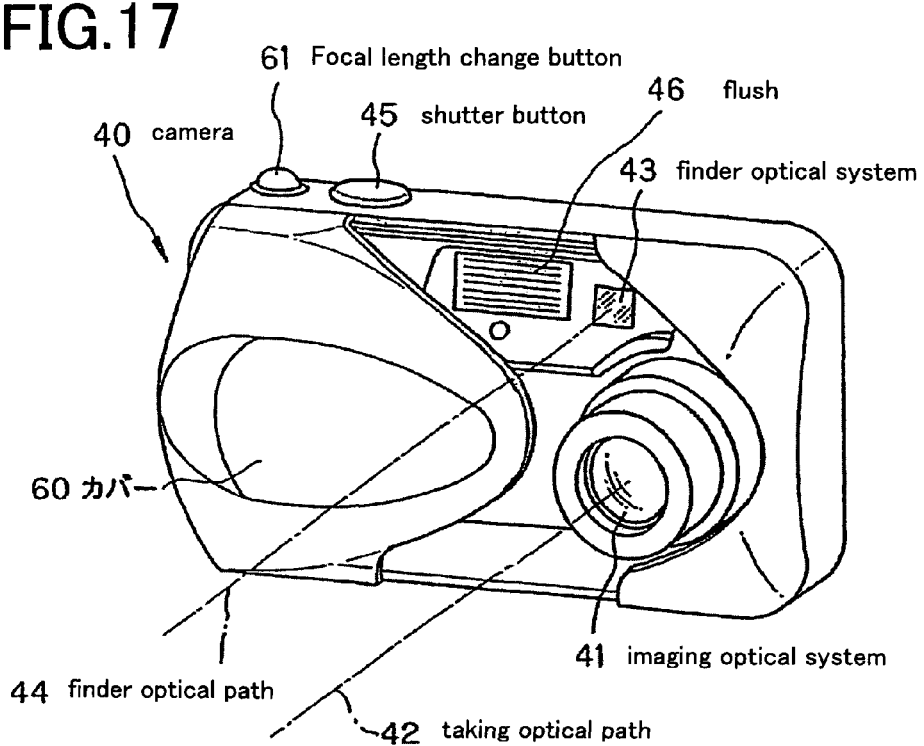
FIG. 17 is a front perspective view of the outside shape of a digital camera according to the invention.
Figure 18:
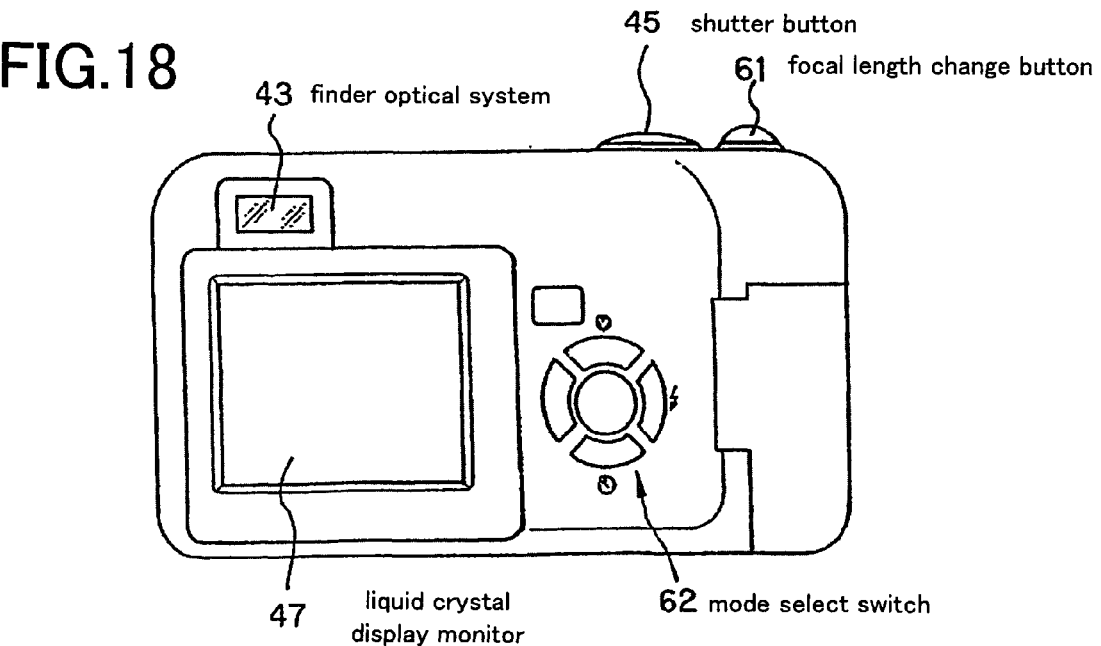
FIG. 18 is a rear perspective view of the digital camera of FIG. 17.
Figure 19:
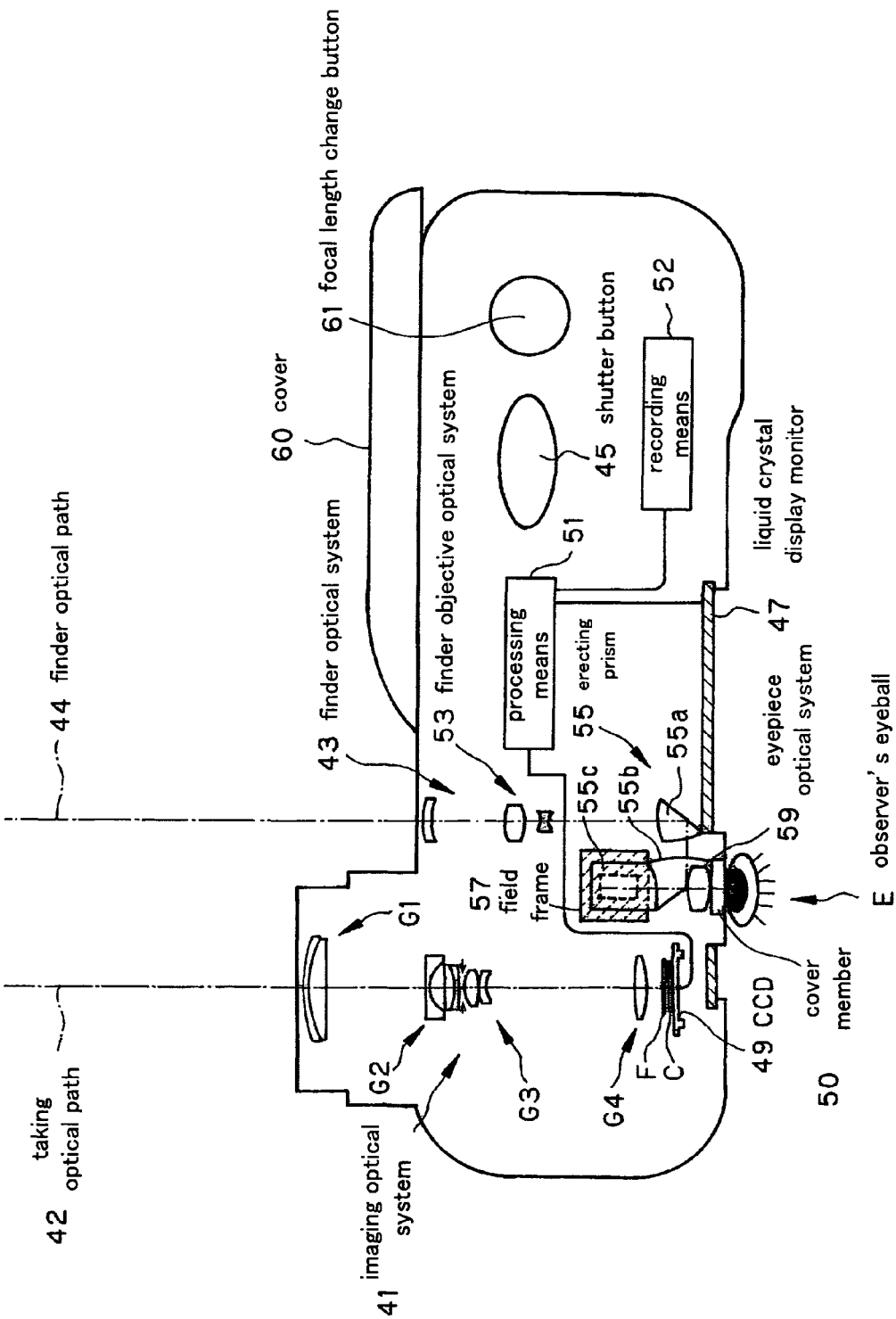
FIG. 19 is a sectional view of the digital camera of FIG. 17.

FIGS. 17-20 are conceptual illustrations of a digital camera, in which such an inventive zoom lens as set forth above is incorporated in a taking optical system 41. FIG. 17 is a front perspective view of the appearance of a digital camera 40; FIG. 18 is a rear perspective view of the same; and FIG. 19 is a schematic sectional view of the setup of the digital camera 40. However, FIGS. 17 and 19 show the taking optical system 41 in operation. In the embodiment here, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is let out, as in FIG. 17. As the shutter button 45 mounted on the upper portion of the camera 40 is pressed down, it causes an image to be taken through the taking optical system 41, for instance, the zoom lens of Example 1. An object image formed by the taking optical system 41 is formed on the imaging plane (photoelectric transformation plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be set up in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 17-18) and an erecting prism system 55 composed of erecting prisms 55*a*, 55*b* and 55*c*, and whose focal length varies in association with the zoom lens that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 20:
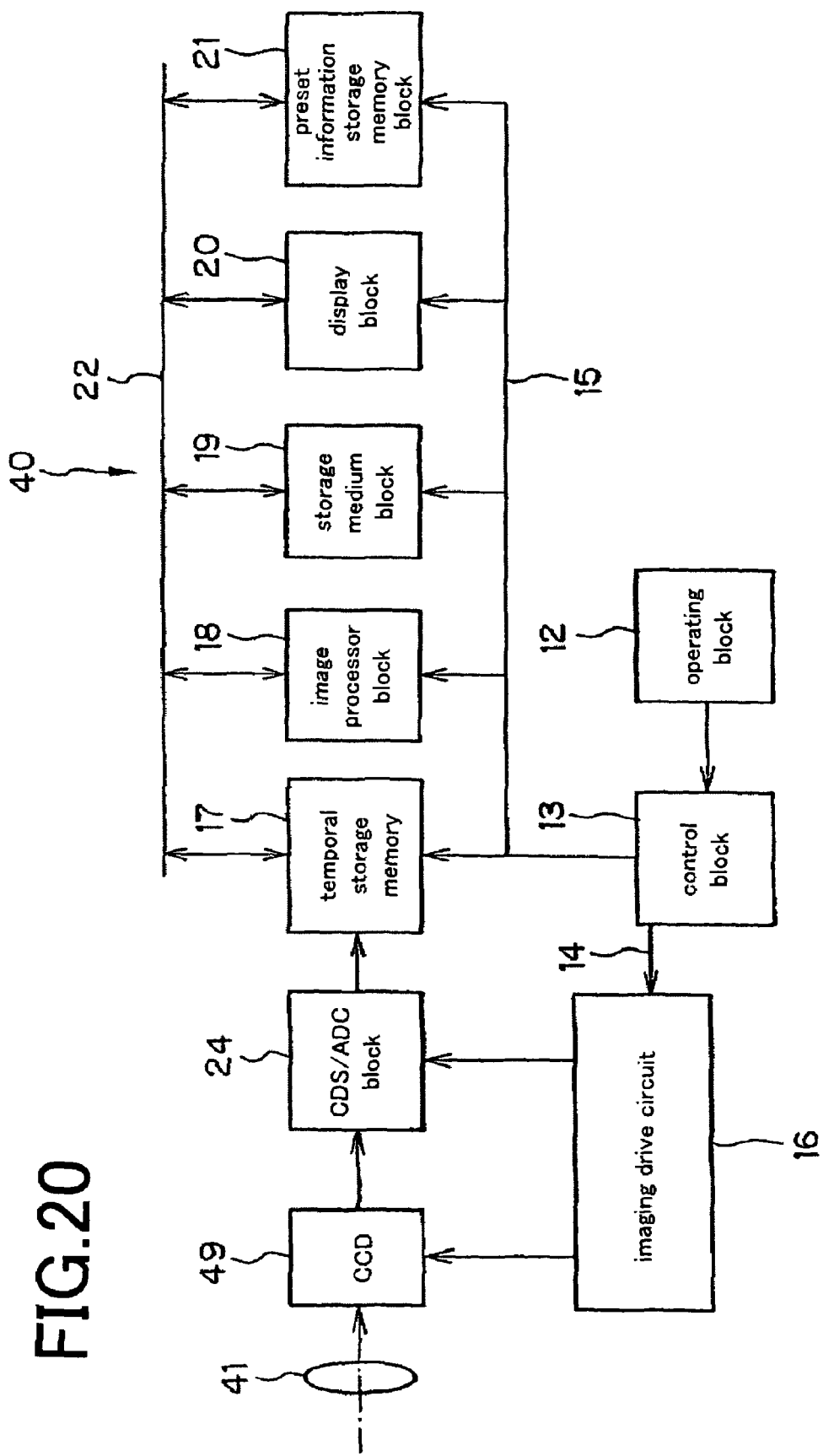
FIG. 20 is a block diagram illustrative of the construction of internal circuits in part of the digital camera of FIG. 17.
Figure 21:
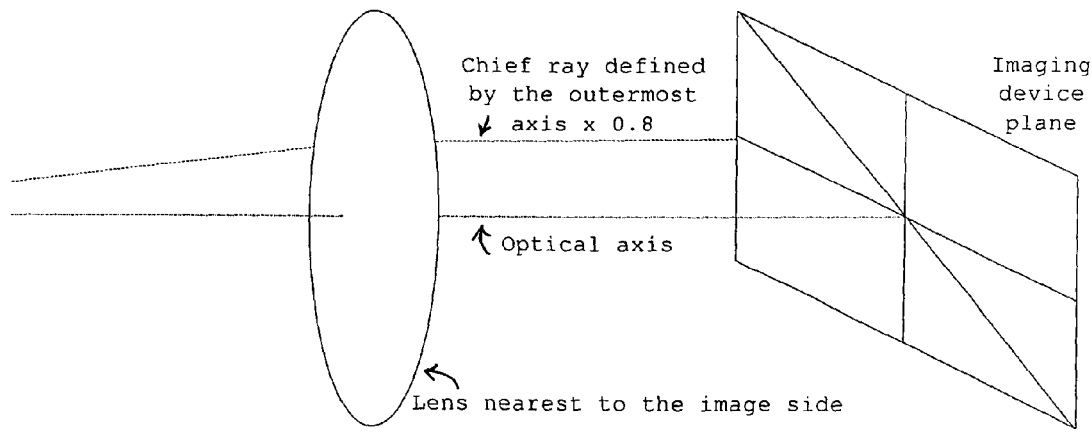
FIG. 21 is a diagram illustrating an optical axis and a chief ray for an image height defined by the outermost axis X 0.8.
Figure 22:
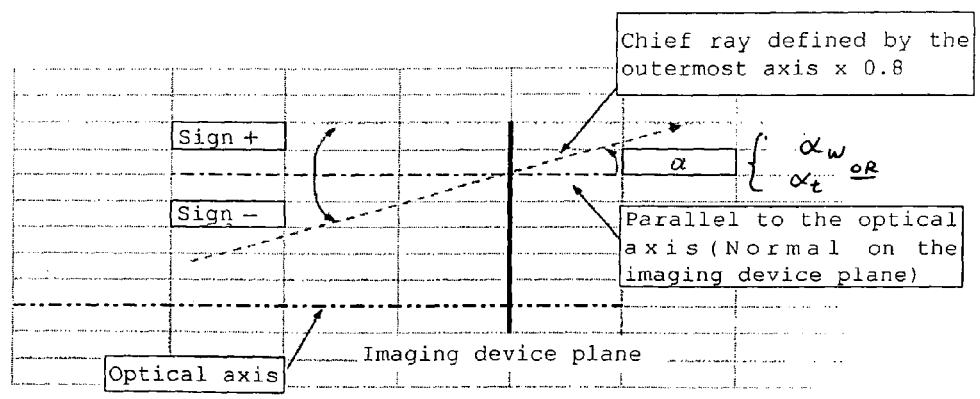
FIG. 22 is a diagram illustrating angle α defined by an angle of the chief ray for an image height defined by the outermost axis X 0.8 with respect to the optical axis.

FIG. 20 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 20, the digital camera 40 is built up of an operating block 12, a control block 13 connected to the operating block 12 and an imaging drive circuit 16 connected to the control signal output port of the control block 13 via buses 14 and 15 as well as a temporal storage memory block 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 22, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw image data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable imaging capabilities all over the zoom range, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

More preferably, conditions (1) and (3) should be reduced down to (1)' and (1)" as well as (3)' and (3)" as set below:

$$|\alpha_t - \alpha_w| > 9 \qquad (1)'$$

$$|\alpha_t - \alpha_w| > 10 \qquad (1)''$$

$$5 < f_t/f_w < 40 \qquad (3)' \text{ and}$$

$$7 < f_t/f_w < 30 \qquad (3)''$$

Only the upper or lower value of each condition may as well be redefined as a new one.

What is claimed is:

1. An electronic imaging apparatus including a zoom lens, wherein:

said zoom lens comprises at least two lens groups;

said zoom lens is adapted to implement zooming by changing a spacing between the respective lens groups; and said zoom lens comprises at least one positive lens element on an imaging device side with respect to an aperture stop, with satisfaction of the following conditions (1), (2) and (3)':

$$|\alpha_t - \alpha_w| > 8 \qquad (1)$$

$$1.0 \times 10^{-3} < P < 4.0 \times 10^{-3} \qquad (2)$$

$$5 < f_t/f_w < 50 \qquad (3)'$$

where $f_w$ is a focal length of a whole zoom lens system at a wide-angle end, $f_t$ is a focal length of the whole zoom lens system at a telephoto end, $\alpha_w$ is an angle (°) with an optical axis of a chief ray for an image height defined by a farthest off-axis chief ray X 0.8 at the wide-angle end upon incidence on the imaging device on condition that a positive sign indicates that a height of a ray passing through a surface of the imaging device is lower than that of a ray passing through a surface of a lens just in front of the imaging device wherein the height of a ray refers to a distance between a position of the ray incident on the lens surface and the optical axis, $\alpha_t$ is an angle (°) with the optical axis of a ray for an image height defined by a farthest off-axis ray X 0.8 at the telephoto end upon incidence on the imaging device on condition that the height of a ray passing through the surface of the imaging device is lower than that of a ray passing through the surface of the lens just in front of the imaging device, and P is a pixel pitch of the imaging device (in mm).

2. The electronic imaging apparatus according to claim 1, wherein upon zooming from the wide-angle end to the telephoto end, the aperture stop in said zoom lens moves in a direction away from the imaging device.

3. The electronic imaging apparatus according to claim 1, wherein:

said zoom lens comprises, in order from the object side, a negative first lens group, an aperture stop, a positive second lens group, and a positive third lens group, and wherein upon zooming from the wide-angle end to the telephoto end, a spacing between said first lens group and said second lens group becomes narrow, and a spacing between said second lens group and said third lens group grows wide.

4. An electronic imaging apparatus including a zoom lens, wherein:

said zoom lens comprises at least two lens groups;

said zoom lens is adapted to implement zooming by changing a spacing between the respective lens groups; and said zoom lens comprises at least one positive lens element on an imaging device side with respect to an aperture stop, with satisfaction of the following conditions (1), (2) and (3):

$|\alpha_t - \alpha_w| > 8$ (1)

$1.0 \times 10^{-3} < P < 4.0 \times 10^{-3}$ (2)

$4 < f_t/f_w < 50$ (3)

wherein said zoom lens further satisfies the following conditions (4) and (5):

$-40 < \alpha_w < -9$ (4)

$1.8 < \alpha_t < 10$ (5)

where $f_w$ is a focal length of a whole zoom lens system at a wide-angle end, $f_t$ is a focal length of the whole zoom lens system at a telephoto end, P is a pixel pitch of the imaging device (in mm);

$\alpha_w$ is an angle (°) with an optical axis of a chief ray for an image height defined by a farthest off-axis chief ray X 0.8 at the wide-angle end upon incidence on the imaging device on condition that a positive sign indicates that a height of a ray passing through a surface of the imaging device is lower than that of a ray passing through a surface of a lens just in front of the imaging device wherein the height of a ray refers to a distance between a position of the ray incident on the lens surface and the optical axis, and $\alpha_t$ is an angle (°) with the optical axis of a ray for an image height defined by a farthest off-axis ray X 0.8 at the telephoto end upon incidence on the imaging device on condition that the height of a ray passing through the surface of the imaging device is lower than that of a ray passing through the surface of the lens just in front of the imaging device.

5. An electronic imaging apparatus including a zoom lens, wherein:

said zoom lens comprises at least two lens groups;

said zoom lens is adapted to implement zooming by changing a spacing between the respective lens groups; and said zoom lens comprises at least one positive lens element on an imaging device side with respect to an aperture stop, with satisfaction of the following conditions (1), (2) and (3):

$|\alpha_t - \alpha_w| > 8$ (1)

$1.0 \times 10^{-3} < P < 4.0 \times 10^{-3}$ (2)

$4 < f_t/f_w < 50$ (3)

wherein said zoom lens further satisfies the following condition (6):

$0.25 < f_{sr}/f_t < 0.41$ (6)

where $f_w$ is a focal length of a whole zoom lens system at a wide-angle end, $\alpha_w$ is an angle (°) with an optical axis of a chief ray for an image height defined by a farthest off-axis chief ray X 0.8 at the wide-angle end upon incidence on the imaging device on condition that a positive sign indicates that a height of a ray passing through a surface of the imaging device is lower than that of a ray passing through a surface of a lens just in front of the imaging device wherein the height of a ray refers to a distance between a position of the ray incident on the lens surface and the optical axis, $\alpha_t$ is an angle (°) with the optical axis of a ray for an image height defined by a farthest off-axis ray X 0.8 at the telephoto end upon incidence on the imaging device on condition that the height of a ray passing through the surface of the imaging device is lower than that of a ray passing through the surface of the lens just in front of the imaging device, P is a pixel pitch of the imaging device (in mm);

$f_{sr}$ is a focal length of a lens group nearest to the imaging device, and $f_t$ is the focal length of the whole zoom lens system at the telephoto end.

6. An electronic imaging apparatus including a zoom lens, wherein:

said zoom lens comprises at least two lens groups;

said zoom lens is adapted to implement zooming by changing a spacing between the respective lens groups; and said zoom lens comprises at least one positive lens element on an imaging device side with respect to an aperture stop, with satisfaction of the following conditions (1), (2) and (3):

$|\alpha_t - \alpha_w| > 8$ (1)

$1.0 \times 10^{-3} < P < 4.0 \times 10^{-3}$ (2)

$4 > f_t/f_w < 50$ (3)

where $f_w$, is a focal length of a whole zoom lens system at a wide-angle end, $f_t$ is a focal length of the whole zoom lens system at a telephoto end, $\alpha_w$ is an angle (°) with an optical axis of a chief ray for an image height defined by a farthest off-axis chief ray X 0.8 at the wide-angle end upon incidence on the imaging device on condition that a positive sign indicates that a height of a ray passing through a surface of the imaging device is lower than that of a ray passing through a surface of a lens just in front of the imaging device wherein the height of a ray refers to a distance between a position of the ray incident on the lens surface and the optical axis, $\alpha_t$ is an angle (°) with the optical axis of a ray for an image height defined by a farthest off-axis ray X 0.8 at the telephoto end upon incidence on the imaging device on condition that the height of a ray passing through the surface of the imaging device is lower than that of a ray passing through the surface of the lens just in front of the imaging device, P is a pixel pitch of the imaging device (in mm), wherein:

said zoom lens comprises, in order from an object side thereof, a first lens group having positive refracting power, a second lens group having negative refracting power, an aperture stop, and a third lens group having positive refracting power, and wherein upon zooming from the wide-angle end to the telephoto end, a spacing between said first lens group and said second lens group grows wide, and a spacing between said second lens group and said third lens group becomes narrow.

7. The electronic imaging apparatus according to claim 6, wherein said zoom lens further comprises a fourth lens group having positive refracting power between said third lens group and said electronic imaging device.

8. The electronic imaging apparatus according to claim 7, wherein said fourth lens group consists of one positive lens element that satisfies the following condition (7):

$$-1<(R_{4r}-R_{4f})/(R_{4r}-R_{4f})<0 \tag{7}$$

where $R_{4r}$ is a radius of curvature on an image plane side of the positive lens in the fourth lens group, and $R_{4f}$ is a radius of curvature on the object side of the positive lens in the fourth lens group.

9. The electronic imaging apparatus according to claim 6, wherein the third lens group comprises a positive lens element having an aspheric surface nearest to the object side, with satisfaction of the following condition (8):

$$0.2<(R_{3r}+R_{3f})/(R_{3r}-R_{3f})<0.8 \tag{8}$$

where $R_{3r}$ is a radius of curvature on the image plane side of the positive lens in the third lens group, and $R_{3f}$ is a radius of curvature on the object side of the positive lens in the third lens group.

10. The electronic imaging apparatus according to claim 7, wherein the third lens group comprises a positive lens element having an aspheric surface nearest to the object side, with satisfaction of the following condition (8):

$$0.2<(R_{3r}+R_{3f})/(R_{3r}-R_{3f})<0.8 \tag{8}$$

where $R_{3r}$ is a radius of curvature on the image plane side of the positive lens in the third lens group, and $R_{3f}$ is a radius of curvature on the object side of the positive lens in the third lens group.

* * * * *